(12) United States Patent
Feth et al.

(10) Patent No.: US 12,437,165 B2
(45) Date of Patent: Oct. 7, 2025

(54) SAFETY SYSTEM AND METHOD USING A SAFETY SYSTEM

(71) Applicant: SICK AG, Waldkirch (DE)

(72) Inventors: Hagen Feth, Waldkirch (DE); Andreas Sixt, Waldkirch (DE); Angelina Mueller, Waldkirch (DE); Holger Waibel, Waldkirch (DE)

(73) Assignee: SICK AG, Waldkirch (DE)

( * ) Notice: Subject to any disclaimer, the term of this patent is extended or adjusted under 35 U.S.C. 154(b) by 160 days.

(21) Appl. No.: 18/371,570

(22) Filed: Sep. 22, 2023

(65) Prior Publication Data

US 2024/0160865 A1     May 16, 2024

(30) Foreign Application Priority Data

Nov. 10, 2022   (DE) .......................... 102022129789.6

(51) Int. Cl.
| | | |
|---|---|---|
| *G06K 7/10* | (2006.01) | |
| *G06K 19/07* | (2006.01) | |
| *G07C 9/27* | (2020.01) | |

(52) U.S. Cl.
CPC ..... *G06K 7/10009* (2013.01); *G06K 19/0723* (2013.01); *G07C 9/27* (2020.01)

(58) Field of Classification Search
CPC .. G06K 7/10009; G06K 19/0723; G07C 9/27; G07C 9/10; G07C 9/28; G07C 9/15; G07C 9/20
See application file for complete search history.

(56) References Cited

U.S. PATENT DOCUMENTS 3,991,858 A * 11/1976 Westerlund ............. B66B 13/20
                                                                    187/331
5,491,482 A *  2/1996 Dingwall ................. G02C 3/02
                                                                    342/42
(Continued)

FOREIGN PATENT DOCUMENTS

DE        202004004273 U1      9/2005
DE        102009023707 A1     12/2009
(Continued)

OTHER PUBLICATIONS

German Office Action dated Jun. 30, 2023 corresponding to application No. 102022129789.6.

*Primary Examiner* — Vernal U Brown
(74) *Attorney, Agent, or Firm* — Nath, Goldberg & Meyer; Jerald L. Meyer; Stanley N. Protigal

(57) ABSTRACT

A method is provided using a safety system. The safety system has an electronic access system for a safety zone for objects, at least one radio transponder and at least one radio station to recognize the radio transponder, at least one control and evaluation unit that is connected to the radio station for evaluating the read radio transponder information, and at least one spatially bounded access zone having an access station. The safety zone is only accessible via the access zone so that the access zone can be passed through by the object before reaching the safety zone and after leaving the safety zone, with the access station being actuated when an object passes through the access zone. Permitted objects have the radio transponder, with the radio transponder having an identification whereby the object can be identified. The permitted objects having the radio transponder can pass through the access zone.

21 Claims, 10 Drawing Sheets

(56) References Cited

U.S. PATENT DOCUMENTS

| | | | | |
|---|---|---|---|---|
| 8,009,013 B1* | 8/2011 | Hirschfeld | ............... | G07C 9/28 |
| | | | | 340/5.82 |
| 2005/0116855 A1* | 6/2005 | Toennesen | ............ | G01S 13/582 |
| | | | | 342/107 |
| 2006/0077034 A1* | 4/2006 | Hillier | .................. | G07F 7/1008 |
| | | | | 340/5.61 |
| 2021/0105616 A1* | 4/2021 | Du | ...................... | H04W 12/068 |

FOREIGN PATENT DOCUMENTS

| | | |
|---|---|---|
| DE | 202020107300 U1 | 4/2022 |
| DE | 102021101180 A1 | 7/2022 |
| EP | 3306173 A1 | 4/2018 |
| WO | 2011090485 A1 | 7/2011 |

* cited by examiner

SAFETY SYSTEM AND METHOD USING A SAFETY SYSTEM

FIELD

The present invention relates to a safety system and to a method using a safety system.

BACKGROUND

EP 3 306 173 A1 discloses a safety system having a safety switch for monitoring a safe state of protective equipment of moving protective equipment having a base body comprising at least two part members that can be positioned with respect to one another, wherein a signal receiver is provided in one part member and a signal transmitter is provided in the other part member so that a safe state of the protective equipment is detectable by means of an evaluation unit, having a locking unit with at least one locking element to lock or unlock the protective device, wherein at least one mobile identification transponder is provided, at least one transponder reading unit that is arranged in the safety switch and that is connected to the evaluation unit, with the evaluation unit or an external central control unit being configured to unlock or lock the locking unit after a check and a verification of the transponder signal received by the identification transponder.

In accordance with EP 3 306 173 A1, the identification takes place in decentralized form in the field or at a plant directly at the safe guard locking of the safety door or via the external central control unit. The machine operator can be equipped with different authorizations, especially with larger machines, without the operation having to take place via the central HMI of the machine or a parallel identification system having to be respectively installed at the door.

DE 202004004273 U1 discloses a system, wherein electronically or electromagnetically addressable identification devices respectively worn/carried by every person or object and having a fixed, individual code, such as a transponder or a contactlessly readable card having a microchip and by transmission/reception stations or read/write stations, that can enter into interaction with the transponders or cards and that are in turn connected to access control devices such as electronically lockable and unlockable door locks by means of wireless or wired connection devices, and/or by a network and/or a databus to which a data processing and storing device is connected for processing, storing, and optionally for forwarding of data to a personal computer, and/or by data input/output devices such as a screen, printer, and a keyboard to control, display, and/or print out the monitored states.

The path of an object such as a package or a briefcase provided with the chip or transponder or also a person wearing the chip or the transponder device can be monitored in this manner in the zone in which the transmission/reception stations or read/write stations are arranged, for example accommodated in closure devices of a design in accordance with the invention. The path of an employee through different rooms of a factory plant or office building can thus in particular be monitored as can the path of a briefcase or of a packet that is equipped with a corresponding transponder or chip.

WO 2011/090485 A1 discloses a safety system comprising a work zone having a perimeter and hazardous automated machinery within the perimeter, wherein the access of employees to the work zone within the perimeter is checked by one or more controlled access points, has at least one safety work cell within the parameter wherein each safety work cell has no hazardous automated machinery within the safety work cell or is accessible from it; a primary key/secondary key system that includes a tertiary key reception within the safety work zone; an optional light barrier that surrounds each safety work cell; a control that is programmed such that the operation of the hazardous automated machinery is only possible when all the controlled access points are closed, all the secondary keys are positioned either in a secondary key or in a secondary key reception, and each light barrier has not been triggered by an interruption of the light barrier. The secondary keys are worn by the persons.

SUMMARY

It is an object of the invention to provide an improved control of objects at an access zone.

The object is satisfied by a safety system having an electronic access control system for a safety zone for objects having at least one radio transponder and at least one radio station to recognize the radio transponder, and at least one control and evaluation unit that is connected to the radio station for evaluating the read radio transponder information, and at least one spatially bounded access zone having an access station, wherein the safety zone is only accessible via the access zone so that the access zone can be passed through by the object before reaching the safety zone and after leaving the safety zone, with the access station being actuated when an object passes through the access zone, wherein permitted objects have the radio transponder, with the radio transponder having an identification whereby the object can be identified, wherein the permitted objects having the radio transponder can pass through the access zone, wherein the control and evaluation unit is configured to read and to check the radio transponder by the radio station on the entry of the object into the safety zone in a first zone in the direction of movement in front of the access zone, wherein the control and evaluation unit is configured to again read and to check the radio transponder in a second zone in the direction of movement after the access zone, wherein a permitted passing through of the access zone and a permitted entry into the safety zone are only present when the radio transponder in the first zone and in the second zone have been read as valid by the radio station and have been checked by the control and evaluation unit, with permitted objects being registered by the control and evaluation unit in the safety zone and non-permitted objects not being registered by the control and evaluation unit in the safety zone.

The object is further satisfied by a method using a safety system having an electronic access control system for a safety zone for objects, having at least one radio transponder and at least one radio station to recognize the radio transponder, and at least one control and evaluation unit that is connected to the radio station for evaluating the read radio transponder information, and at least one spatially bounded access zone having an access station, wherein the safety zone is only accessible via the access zone so that the access zone can be passed through by the object before reaching the safety zone and after leaving the safety zone, with the access station being actuated when an object passes through the access zone, wherein the permitted objects have the radio transponder, with the radio transponder having an identification whereby the object can be identified, wherein the permitted objects having the radio transponder can pass through the access zone, wherein the control and evaluation unit is configured to read and to check the radio transponder by the radio station on the entry of the object into the safety zone in a first zone in the direction of movement in front of the access zone, wherein the control and evaluation unit is configured to again read and to check the radio transponder in a second zone in the direction of movement after the access zone, wherein a permitted passing through of the access zone and a permitted entry into the safety zone are only present when the radio transponder in the first zone and in the second zone has been read as valid by the radio station and has been checked by the control and evaluation unit, with permitted object being registered by the control and evaluation unit in the safety zone and non-permitted objects not being registered by the control and evaluation unit in the safety zone.

The first zone in front of the access zone is in front of the access zone in the access direction. The second zone after the access zone is after the access zone in the access direction. The first zone and the second zone are therefore disposed on respective different sides of the access zone.

The object can, for example, be a person or, for example, an autonomous vehicle.

The access zone has an access station.

Admission to a safety zone can be restricted for various reasons. The safety in the safety zone is ensured by the superior safety system, for example.

An organizational measure (e.g. a sign) does not ensure a 100% access control so that an additional access control is necessary.

Objects without radio transponders or with one radio transponder that does not work properly, for example because a rechargeable battery of the radio transponder is flat, should not have access to the safety zone or the safety system has to initiate a safety measure by means of the control and evaluation unit. The safety measures can be initiated over the whole safety zone or step by step for parts of the safety zone. The safety measures can be introduced in dependence on the distance of the entrance to a respective machine.

The hazard sites of the machines in the safety zone can in this case, for example, be safeguarded by safety sensors such as safety laser scanners, safety light grids, safety door switches, safety shutoff mats, or fences, etc. or protected fields of the safety sensors can be increased in size.

Main accesses are equipped with the access stations, for example. In addition, there can, for example, also be secondary accesses having access stations such as emergency exits.

If there are further access zones or further accesses, they must likewise be monitored. As soon as an access zone has been traversed by an object, for example, safety measures can be initiated by the control and evaluation unit. For example, starting from the site of the access zone, all the hazardous machines in the safety zone can be switched off step by step or safeguarded by local on-site safety sensors.

It is, for example, ensured by an organizational measure that all the objects or persons that enter through the safety zone carry/wear a functioning radio transponder. At least a low safety level is reached by the organizational measure.

An object or person having a radio transponder can therefore only enter or leave the safety zone in the zone of the access zones, that is of the main or secondary accesses. The remaining zones between the access zones are safeguarded or blocked, for example, by means of a barrier, for example by means of a fence.

The barrier or the physical barrier can, for example, be a wall a fence a step, and/or a trench.

The object or person only becomes relevant for the safety zone when the control and evaluation unit has detected the object having the radio transponder in the first zone and subsequently in the second zone and the object or person was registered in the safety zone. The object is then associated with the safety zone by the control and evaluation unit or it is determined that the object is now in the safety zone. If the object was not registered and is present in the safety zone in a non-permitted manner, at least one warning takes place. A safety measure can furthermore also be provided so that hazardous machines are, for example, slowed or stopped in a still further reaching manner. Provision can further be made that autonomous vehicles are slowed to a safe speed or are stopped in a still further reaching manner.

A sequence from the first zone into the second zone therefore has to take place in the correct order. A time limit of the registration can be provided, for example. The access station must furthermore also be actuated. If, for example, the access station is actuated on a passing through of the object, but no detection takes place in the first or second zones due to a missing transponder, an erroneous passing through of the access zone is present and at least one warning is output.

The object can move as close as desired to the barrier at all other points, outside the access zones and outside the safety zone, without this having any influence on the machines and autonomous vehicles in the safety zone. The productivity of the plant is thereby increased.

The access zones can always be open for example, so that the access zones or passage zones can be designed without doors, for example. A barrier-free and simple access zone is thus provided through which objects can quickly pass through the access zone. Productivity can thereby be increased.

Scales can, for example, be arranged in the access zone that can measure when an object or person moves through the access zone.

A person traversing the access zone without a functioning radio transponder is not allowed. A person without a radio transponder may also not traverse the access zone together with a person who is wearing a valid radio transponder.

If the object was not registered and is present in the safety zone in a non-permitted manner, at least one warning takes place.

Non-permitted cases can, for example, be reduced by the following measures. For example, an organizational measure can be provided, for example a sign or an instruction stating that only persons with functioning radio transponders may enter into the safety zone and that the persons may also not take any persons with them who are not wearing a radio transponder. It is, for example, ensured and permitted by measures that a person may move through the access zone who is also on a vehicle, with the vehicle or the person having the radio transponder.

On a defect or failure of the access control system, an authorized person can also register or deregister objects manually to ensure availability of the safety system.

In a further development of the invention, the control and evaluation unit is configured to read and to check the radio transponder by the radio station when the object leaves the safety zone in the second zone in the direction of movement in front of the access zone, with the control and evaluation unit being configured to again read and to check the radio transponder in a first zone in the direction of movement after the access zone, with a permitted passing through of the access zone and a leaving of the safety zone only being present when the radio transponder is read as valid by the radio station in the second zone and in the first zone and when a check has been made by the control and evaluation unit, with permitted objects being deregistered by the control and evaluation unit in the safety zone and non-permitted objects not being deregistered by the control and evaluation unit in the safety zone.

An orderly departure of the object from the safety zone is thereby determined and the object is properly deregistered or the previously carried out registration is canceled again.

If the object has not been properly deregistered or if the object had not borne a valid radio transponder, at least a warning is given.

In a further development of the invention, the safety system is configured for a localization and identification of the object having the control and evaluation unit, having at least one radio location system, with the radio location system having the arranged radio stations, with position data of the radio location system and thus of the object being able to be determined by means of the radio transponder, with the position data being able to be transmitted to the control and evaluation unit by the radio station, and with the control and evaluation unit being configured to evaluate the position data of the radio location system.

A functioning radio transponder is understood as a radio transponder that can successfully exchange data with a sufficiently large number of radio stations within the safety zone at predetermined intervals. In other words, a radio transponder whose position can be detected by a radio location system, formed by the radio stations, the radio transponders, and the control and evaluation unit. The radio stations are arranged in a stationary manner.

Safety outputs at the radio transponder are switched off and an autonomous vehicle is thereby stopped as a safety measure, for example. If, for example, a robot arm is arranged on the vehicle, it is also stopped where necessary. The autonomous vehicle can, for example, in this case also be safeguarded by local safety sensors. A protected field switchover of the safety sensors optionally takes place if the radio transponder no longer functions properly.

Since the object having the radio transponder can only move into the safety zone in the defined access zones or passage zones, the object having the radio transponder can never dwell in the safety zone in a non-allowed or unnoticed manner. If measurement signals of a radio transponder are nevertheless detected at positions within the safety zone without the radio transponder having passed through an access zone, the safety system initiates a safety measure by means of the control and evaluation unit. A safety measure can be a warning in the simplest case. A safety measure can furthermore also be provided so that hazardous machines are, for example, slowed or stopped in a still further reaching manner. Provision can further be made that autonomous vehicles are slowed to a safe speed or are stopped in a still further reaching manner.

The safety system is arranged in a factory workshop, for example. The radio stations can be arranged at the ceiling of the factory workshop, for example. The radio stations can, however, also be arranged at fixed positions in the factory workshop.

In a regular operating state of the safety system, the safety of persons is ensured using the detected positions of the radio transponders in space.

The safety system continuously calculates the distance between persons and movable and stationary objects within the safety zone. As soon as a certain distance is fallen below or a risk characteristic between two participants is exceeded, the safety system initiates measures to reduce a risk. As long as specifications with respect to permitted distances or risk characteristics are satisfied, the control and evaluation unit does not intervene in the automated processes. A productive plant in the safety zone can thereby be operated at the highest productivity level.

If it is ensured with sufficient security that all the persons and objects in the safety zone wear/carry a functioning radio transponder and if the latter is also cyclically or continuously located sufficiently well, local safety sensors can, for example, be switched off or switched into standby. Productivity is thereby likewise improved. Autonomous loading trucks, for example autonomous forklift trucks, can, for example, be fully automatically loaded and unloaded without this being restricted by their local safety sensors.

In a further development of the invention, the access station of the access zone is lockable and can only be passed through by permitted objects. The access station thus has a locking unit.

The locking unit has at least one locking element for locking or unlocking the access station. The locking unit can, for example, have magnetic and/or mechanical locking elements that effect a retaining or closing force.

The locking unit can furthermore have a closing unit by which the access station can be closed and opened. The closing unit comprises a handle, for example.

In a further development of the invention, the access station has a door. The access station or the access zone can be closed and opened by the door. The door has a door switch, whereby the control and evaluation unit can determine whether the door is closed or open.

The door can be a swing door, a sliding door, a roller door, a lock, or a similar door.

A radio station, for example, detects or locates a radio transponder in the first zone in front of the door. The door switch measures that the door has been opened and sends a door open signal to the control and evaluation unit.

A radio station further detects or locates a radio transponder in the second zone after the door. The control and evaluation unit thus detects the passage of the object or person through the door.

If both data, namely that the door has been opened and the permitted radio transponder has been detected in the second zone after the first zone, are present within a certain time window, the entry is classified as allowed. In this case, the association of the radio transponder is carried out in the control and evaluation unit and thus the association of the person or the autonomous vehicle on which the radio transponder is arranged is carried out in an association with the safety zone.

The door switch subsequently measures that the door has been closed again and sends a door closed signal to the control and evaluation unit. The door closed signal can be considered for a permitted routine by the control and evaluation unit.

The safety system or the control and evaluation unit could initiate a safety measure in the following cases or could output a warning to the person or to the user.

The door switch admittedly sends a door open signal to the control and evaluation unit that the door has been opened, but not a door closed signal after the elapse of a maximum time. I.e. the door is permanently open. Optionally, a timer or counter of the control and evaluation unit is stopped when a radio transponder is in the region of the door.

The door switch sends a door open signal to the control and evaluation unit that the door has been opened without a functioning radio transponder having been in the first zone in front of the door and in the second zone after the door in the same time period.

In a further development of the invention, the access station has a door with a door guard locking. The door guard locking can be opened and closed by means of the radio transponder.

The door can be a swing door, a sliding door, a roller door, a lock, or similar. A sliding door often has a right and left, movable, displaceable sliding door part. A lock can have two doors with a space between the doors.

The radio location system locates a functioning radio transponder in the first zone in front of the door. The control and evaluation unit releases the door switch in that the control and evaluation unit sends an opening signal to the door guard locking to open it.

The safety system recognizes by means of the control and evaluation unit and the radio station that a passage has taken place when the radio transponder has been detected in the second zone after the door that can already be in the safety zone. When the radio transponder moves from the first zone in front of the door to the second zone behind the door, the move is classified as allowed and permitted.

In a further development of the invention, the access station has a mechanical turnstile or a revolving door. The access station or the access zone can be closed and opened by the turnstile. The turnstile has a door switch, whereby the control and evaluation unit can determine whether the door is closed or open.

In a further development of the invention, the access station has a mechanical turnstile having a turnstile guard locking.

If turnstiles are used, a climbing over or crawling below must where necessary be safeguarded by other safety measures. E.g. by fences or safety light grids or safety light barriers.

The release of the door locking safeguard with turnstiles corresponds to the release of the rotation about a section.

In a further development of the invention, the access station has a spatially resolving sensor. The spatially resolving sensor has a detection zone or a protected field to detect objects, for example persons.

The sensor can, for example, be a radar sensor, an ultrasound sensor, an optoelectronic sensor, or similar sensors.

The access station preferably has a spatially resolving optoelectronic sensor. The optoelectronic sensor has a detection zone or a protected field, to detect objects, for example persons.

Whether a person wants to pass through the access zone without a radio transponder can be detected by the spatially resolving optoelectronic sensor.

Access zones or passage zones that are safeguarded by a spatially resolving optoelectronic sensor, for example a light grid or a laser scanner, allow an almost unimpeded flow of persons and material and it can simultaneously be ensured that the information whether persons without radio transponders are actually in the second zone behind the light grid or not is made available to the safety system.

Optionally, it can also be prevented by an organizational measure here that a person without a radio transponder passes through the protected field of the optoelectronic sensor at the same time as a person with a radio transponder.

The optoelectronic sensor can be a light grid, a laser scanner, a solid state laser scanner, a camera, a 3D camera, a camera based person counting system, or a similar sensor.

The spatially resolving optoelectronic sensor can replace a door.

The spatially resolving optoelectronic sensor outputs an object determination signal to the control and evaluation unit when an object or a person has passed through the access zone. The routine corresponds to that of a door having a door zone. The signal from the spatially resolving sensor replaces the signal from the door switch.

The control and evaluation unit does not trigger a safety function if a person having a functional radio transponder passes through the protected field of the spatially resolving sensor. I.e. if the radio transponder is located by the safety system or the radio stations in the second zone behind the line defined in the protected field of the spatially resolving sensor. Even if a person without a radio transponder passes through the protected field of the spatially resolving sensor, the control and evaluation unit increments the person counter for the safety zone by one unit. In the simplest case, the safety system then initiates a safety measure.

Optionally, the object size and the position within the protected field can be monitored. If, for example, the object is too large, is too small, or passes through at the wrong point the spatially resolving sensor reports this "error" to the control and evaluation unit that then initiates a safety measure. The information on the object size, etc. can be transmitted to the spatially resolving sensor either by the control and evaluation unit or can come from a further radio station.

Other spatially resolving sensors can also be used instead of a safety light grid. E.g. multibeam light grids, safety laser scanners. solid state laser scanners, camera based person counting systems, 3D cameras, or infrared cameras. Individual persons can be detected using these sensors.

No further safety safeguarding of the hazardous site is, for example, necessary if an autonomous vehicle stops in the access zone and safeguard the hazard site in the safety zone behind the door or gate if the autonomous vehicle is so wide that a person can then no longer move past it through the protected field of the light grid. Only dangerous zones at the autonomous vehicle itself have to be safeguarded. An open and wide access zone can thereby be simply passed through by an autonomous vehicle.

In a further development of the invention, the spatially resolving sensor is bridged when the control and evaluation unit reads permitted object information from the radio transponder.

Permitted objects are thus detected with reference to the object contour and the objects can pass through the access zone with a permitted object contour. This function is also called muting.

In a further development of the invention, the optoelectronic spatially resolving sensor is configured to detect an object contour and the control and evaluation unit is configured to compare the detected object contour with a stored object contour associated with the object and to classify the object as a permitted object on agreement.

The protected field of the local spatially resolving sensor or safety sensor is adapted, for example when a functioning radio transponder approaches the access zone. The control and evaluation unit bridges the spatially resolving sensor while the object having the radio transponder passes through the access zone.

When a person enters the second zone behind the spatially resolving sensor the spatially resolving sensor or the control and evaluation unit triggers a safety measure for this zone. The localization takes place by the radio stations with reference to the radio transponder on the person. It can, for example, simultaneously be allowed that autonomous vehicles can travel in and out in any desired number without a safety measure being initiated.

Optionally, a part of the protected field can remain active instead of a complete muting of the spatially resolving sensor. I.e. the protected field is partially or partly muted (partial or part muting window). For example to mute the contour of the respective object. The contour can be stored in the local spatially resolving sensor (e.g. safety light grid/laser scanner, etc.), can be invoked by it in a database, or can be respectively provided via the control and evaluation unit. The switching over of the protected field takes place, for example, by an operating mode switchover in the light grid or protected field switchover at the safety laser scanner/solid state scanner. It can be prevented by the partial muting that persons without radio transponders enter the safety zone.

In a further development of the invention, a display unit is arranged at the access zone.

The display is, for example, formed by a traffic light. The person can see with reference to the traffic light that he may enter the safety zone if the associated radio transponder is functioning properly and optional inspections would have been passed where necessary.

The traffic light can be a screen on which inter alia text is presented by color markings. The traffic light can alternatively be a simple display lamp.

The traffic light visually represents the different states.

In a further development of the invention, at least two radio transponders are arranged at the object. A redundant system is formed by two radio transponders. The object can be effectively detected by the second radio transponder even on the failure of one radio transponder.

In a further development of the invention, the radio transponder has mechanical and/or electronic and/or electromagnetic locking means and is arranged at the object in a locked manner.

The monitoring of the functioning radio transponder on persons and objects takes place continuously. One or more of the following requirements can be checked by the control and evaluation unit in the access zone.

A check is, for example, made cyclically whether the radio transponder is still functioning properly. A check is, for example, made whether a radio connection to a sufficiently high number of radio stations is present.

The rechargeable battery charge status respectively the battery charge status can furthermore be checked. If, for example, there is still enough power in the rechargeable battery respectively battery so that the radio transponder can still be operated properly for at least a, for example, preset time.

A check can furthermore be made whether the object or the person is also carrying/wearing the radio transponder properly. A check is made with autonomous vehicles whether the radio transponder is still tied to the position it should be at.

An error is, for example, reported if the person is only holding the radio transponder in his hand and has not properly fastened it to his body or to an article of clothing.

A check takes place, for example, whether a radio connection to a sufficiently high number of radio stations is present.

The radio transponder, for example, has sensors for detecting vital signals of the persons. Vital signals are, for example, a pulse beat, a body temperature, or other vital signals.

Vital signals are, for example checked or whether, for example, a mechanical closer or an electromagnetic closer is properly locked.

If the radio transponder is admittedly working properly, that is, is communicating properly with the radio stations, but is not worn properly by the person, the person is given a warning or the door is not opened.

A check can furthermore be made whether the person is authorized to enter the safety zone. A check is made, here, for example, whether the person has a corresponding qualification.

With autonomous vehicles, a check is, for example, made whether the autonomous vehicle is authorized to travel into the zone due to its load (for example hazardous material, overhanging load, permitted trailer, or similar).

If the safety system provides that the person or the mobile vehicle has to carry a plurality of radio transponders, a plurality of radio transponders are checked.

In a further development of the invention, the control and evaluation unit is configured to again read and to check the radio transponder in a third zone after the access zone, with a permitted passing through of the access zone only being present if the radio transponder has been read as valid by the radio station in the first zone, in the second zone, and in the third zone and has been checked by the control and evaluation unit.

A lock having two doors and a space between the doors for a person is provided, for example. The third region is here provided between the doors. A door switch is provided, for example.

The door switch of the first door or of the second door is actuated and respectively transmits a door actuation signal to the control and evaluation unit.

Only one of the two doors is always opened, for example, while the second door remains closed. A direct passing through of the access zone is thus prevented and a stop always has to take place in the third zone between the doors.

The person is at least located in the first zone or in the second zone.

If all the required data are present in the control and evaluation unit within a certain time window, namely that both doors have been opened after each other and the radio transponder has changed the zones after one another, the move is classified as allowed and permitted. The association of the radio transponder with the respective zone in the safety system is changed by the control and evaluation unit.

The door switch measures that the door has been closed and sends a signal to the control and evaluation unit.

In a further development of the invention, the radio location system is an ultra wideband radio location system, with the frequency used being in the range from 3.1 GHz to 10.6 GHz, with the transmission energy per radio station amounting to a maximum of 0.5 mW.

An absolute bandwidth in an ultra wideband radio location system amounts to at least 500 MHz or a relative bandwidth amounts to at least 20% of the central frequency.

The range of such a radio location system amounts, for example, to 0 to 50 m. In this respect, the short time duration of the radio pulses is used for the localization.

The radio location system thus only transmits radio waves at a low energy.

In a further development of the invention, a hazardous movement of a machine in at least one hazardous zone or a danger zone within the safety zone is changed to a safe state when the object approaches the hazardous zone or the object is in the hazardous zone. The remaining parts of the plant can thereby continue to be productively operated.

In a further development of the invention, at least some of the plant is in a safe state in whose zone the object is detected. The remaining parts of the plant can thereby continue to be productively operated.

In a further development of the invention, the access zone is arranged having at least one access station for a plant, with the plant having at least one safety zone and at least one hazardous zone within the safety zone.

In a further development of the invention, an NFC radio interface or a Bluetooth radio interface is additionally provided at the access station for the identification of objects.

Only if the permitted objects are recognized by the additional NFC radio interface or Bluetooth interface are they registered by the control and evaluation unit in the safety zone.

For example, factory IDs of persons or attached NFC transponders or Bluetooth transponders on object scan be read by the NFC radio interface or the Bluetooth radio interface.

In a further development of the invention, a barcode reader or a pixel code reader is additionally provided at the access station for the identification of objects.

Only if permitted objects are recognized by the additional barcode reader or pixel code reader are they registered by the control and evaluation unit in the safety zone.

For example, factory IDs of persons or attached code labels at objects can be read by the barcode reader or pixel code reader.

Facial recognition or a fingerprint sensor can also be provided, for example, to enable an additional identification of persons.

BRIEF DESCRIPTION OF THE DRAWINGS

The invention will also be explained in the following with respect to further advantages and features with reference to the enclosed drawing and embodiments. The Figures of the drawing show in.

DETAILED DESCRIPTION

Figure 1:
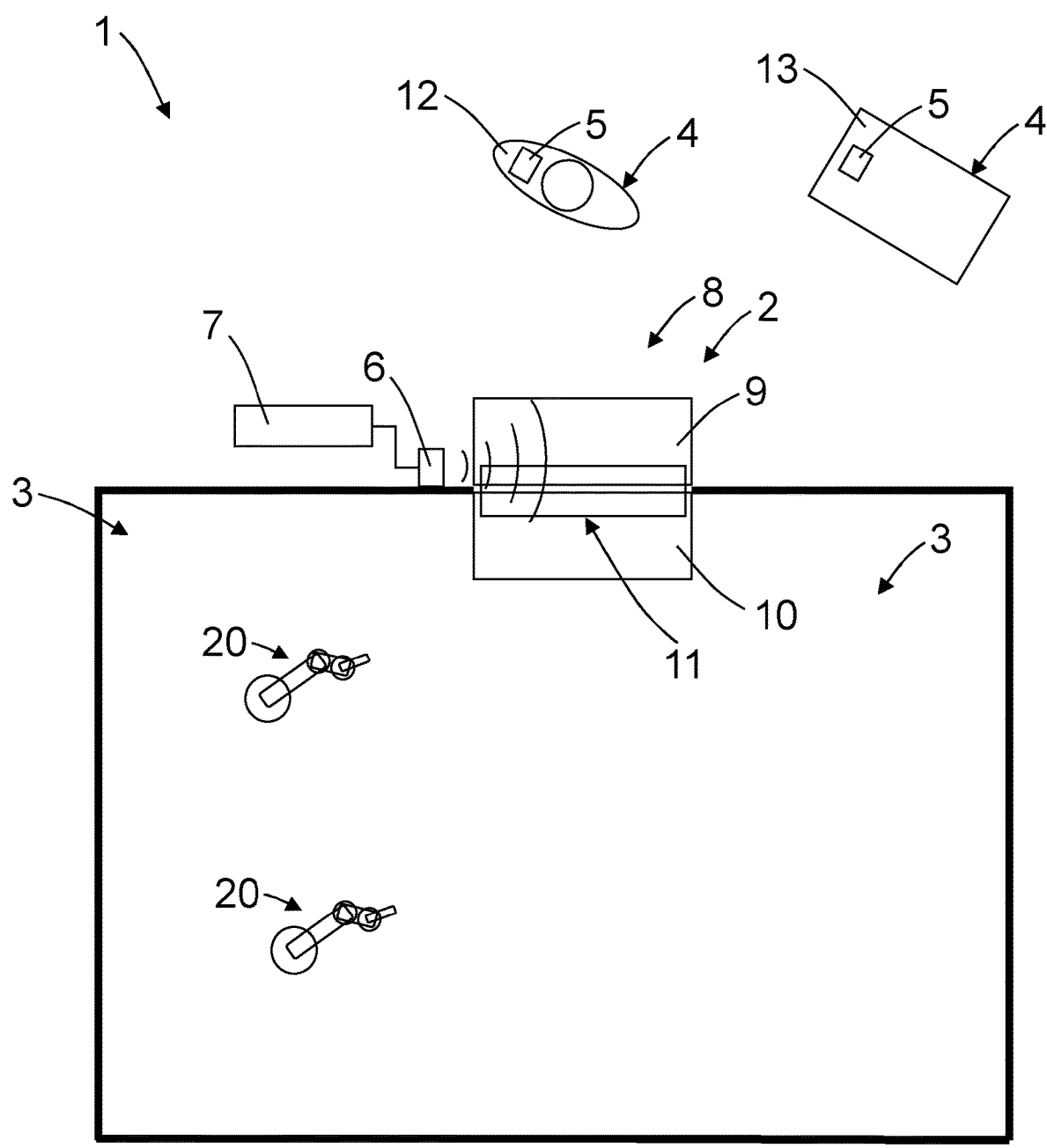
FIG. 1 to FIG. 10 respectively a safety system.

In the following Figures, identical parts are provided with identical reference numerals.

FIG. 1 shows a safety system 1 having an electronic access control system 2 for a safety zone 3 for objects 4 having at least one radio transponder 5 and at least one radio station 6 to recognize the radio transponder 5, and at least one control and evaluation unit 7 that is connected to the radio station 6 for evaluating the read radio transponder information, and at least one spatially bounded access zone 8 having an access station, wherein the safety zone 3 is only accessible via the access zone 8 so that the access zone 8 can be passed through by the object 4 before reaching the safety zone 3 and after leaving the safety zone 3, with the access station being actuated when the object passes through the access zone, wherein permitted objects have the radio transponder 5, with the radio transponder 5 having an identification whereby the object 4 can be identified, wherein the permitted objects 4 having the radio transponder 5 can pass through the access zone 8, wherein the control and evaluation unit 7 is configured to read and to check the radio transponder 5 by the radio station 6 on the entry of the object into the safety zone 3 in a first zone 9 in the direction of movement in front of the access zone 8, wherein the control and evaluation unit 7 is configured to again read and to check the radio transponder 5 in a second zone 10 in the direction of movement after the access zone 8, wherein a permitted passing through of the access zone 8 and a permitted entry into the safety zone 3 are only present when the radio transponder 5 in the first zone 9 and in the second zone 10 have been read as valid by the radio station 6 and have been checked by the control and evaluation unit 7, with permitted objects being registered by the control and evaluation unit in the safety zone and non-permitted objects not being registered by the control and evaluation unit in the safety zone.

The object 4 can, for example, be a person 12 or, for example, an autonomous vehicle 13. In accordance with FIG. 2, for example, the access zone 8 has an access station 11.

Persons 12 without radio transponders or with one radio transponder 5 that does not work properly, for example because a rechargeable battery of the radio transponder 5 is flat, should not have access to the safety zone 3 or the safety system 1 has to initiate a safety measure by means of the control and evaluation unit 7. The safety measures can be initiated over the whole safety zone 3 or step by step for parts of the safety zone 3. The safety measures can be introduced in dependence on the distance of the entrance from a respective machine.

The hazard sites of the machines 20 in the safety zone 3 can, for example, be safeguarded by local safety measures, for example by safety sensors such as safety laser scanners, safety light grids, safety door switches, safety shutoff mats, or fences, etc. or protected fields of the safety sensors can be increased in size.

If there are further access zones 8 or further accesses, they must likewise be monitored. As soon as an access zone 8 has been traversed by a person 12, for example, safety measures can be initiated by the control and evaluation unit 7. For example, starting from the site of the access zone 8, all the hazardous machines 20 can be switched off step by step or safeguarded by local on-site safety sensors.

An object 4 or person 12 having a radio transponder 5 can only enter or leave the safety zone 3 in the zone of the access zones 8, that is of the main or secondary accesses. The remaining zones between the access zones are safeguarded or blocked, for example, by means of a barrier, for example by means of a fence.

The object 4 or the person 12 only becomes relevant to the safety zone 3 when the control and evaluation unit 7 has detected the object 4 having the radio transponder 5 in the first zone 9 and subsequently in the second zone 10. The object 4 is then associated with the safety zone 3 by the control and evaluation unit 7 or it is determined that the object 4 is now in the safety zone 3

The access zones 8 can always be open for example, so that the access zones or passage zones can be designed without doors, for example.

A person 12 wanting to traverse the access zone 8 without a functioning radio transponder 5 is not allowed. A person 12 without a radio transponder 5 may also not traverse the access zone 8 together with a person 12 who is wearing a valid radio transponder 5.

Application examples include all the safety zones 3 where it must be able to be reconstructed when a person 12 has dwelled where for how long. Examples for this are safety applications in the sense of functional safety, but also security applications.

A safety zone monitoring with respect to Covid 19 monitoring can, for example, also be carried out.

For example, sensitive zones that are contaminated by chemicals after an accident or the leaking of potentially hazardous substances in a safety zone, for example, can represent an application case.

Theft monitoring can also represent an application case. It is possible to reconstruct with reference to the radio transponders 5 which persons 12 have been in a safety zone 3 over a certain time period. If something is absent, something has gone missing, or has been stolen in the safety zone 3 over the same time period, it is possible to reconstruct who might be the thief, namely the persons 12 who were present in the safety zone at the time period in question. Certain objects can optionally also be equipped with radio transponders 5. The trajectories of the radio transponders 5 of the persons 12 can then be correlated with the objects 4 to further restrict the number of possible thieves.

A further application is the check of a clean room. A check can be made here, for example, why a clean room class has not been satisfied. The results of the particle measurement, according to which the determination of the current clean room class takes place, can for this purpose be correlated with the number of persons 12 present. If no person 12 is present or if fewer than typical are present in the comparison time period and if at the same time the set clean room class is not satisfied, an error has occurred. A defective air filter system can thus, for example, be reported at an early time.

Figure 3:
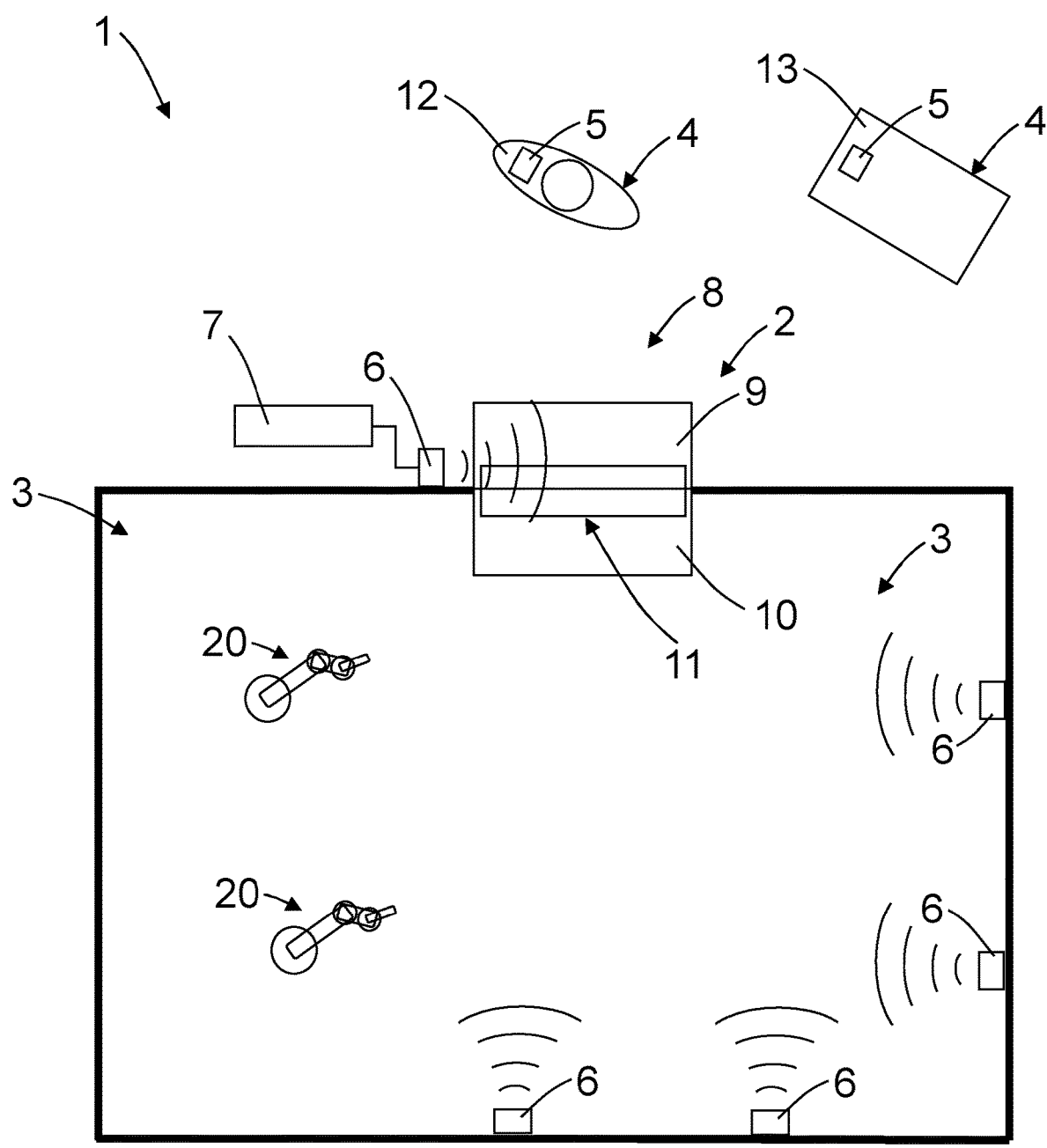

The safety system 1 in accordance with FIG. 3 is, for example, configured for a localization and identification of the object 4, having the control and evaluation unit 7, having at least one radio location system, with the radio location system having the arranged radio stations 6, with position data of the radio transponder and thus of the object 4 being able to be determined by means of the radio location system, with the position data being able to be transmitted to the control and evaluation unit 7 by the radio station 6 of the radio location system and with the control and evaluation unit 7 being configured to evaluate the position data of the radio transponder 5.

The safety system 1 is arranged in a factory workshop, for example. The radio stations 6 can be arranged at the ceiling of the factory workshop, for example. The radio stations 6 can, however, also be arranged elevated in space at fixed positions in the factory workshop.

In a regular operating state of the safety system 1, the safety of persons 12 is ensured using the detected positions of the radio transponders 5 in space.

The safety system 1 continuously calculates the distance between the persons 12 and the movable objects 4 and the stationary hazardous machines 20 within the safety zone 1. As soon as a certain distance is fallen below or a risk characteristic between two participants is exceeded, the safety system 1 initiates measures to reduce a risk. As long as specifications with respect to permitted distances or risk characteristics are satisfied, the control and evaluation 7 unit does not intervene in the automated processes. A productive plant in the safety zone 1 can thereby be operated at the highest productivity level.

If it is ensured with sufficient security that all the persons 12 and objects 4 in the safety zone 1 have a functioning radio transponder 5 and if the latter is also cyclically located sufficiently well, local safety sensors can, for example, be switched off or switched into standby. Productivity is thereby likewise improved. Autonomous loading trucks, for example autonomous forklift trucks, can, for example, be fully automatically loaded and unloaded without this being restricted by local safety sensors.

Defined zones can, for example, also be present having poor or no radio coverage within the safety zone 1. There can also be zones within the safety zone 1 in which the radio connection between radio transponders and a sufficient number of radio stations is not ensured in partial zones. I.e. there is, for example, only sufficiently good radio location coverage just behind the access zone 8.

If a radio transponder 5 can no longer be located sufficiently well within a zone in the safety zone 3 due to known shading (e.g. within a metal container/truck/locally restricted zones), a protected zone of the radio transponder 5 is then expanded by means of local safety sensors to a locally restricted region or zone. The protected zone is then bounded by physical barriers. At points without barriers, the protected zone ends where it is ensured that the radio transponder 5 can again be located sufficiently well.

I.e. the control and evaluation unit 7 does not calculate any distances in this zone since the localization is not ensured. Instead, only the number of persons 12 is counted that are in the safety zone 1. If there is only one machine 20 with a radio transponder 5 within this zone, it can work completely as normal. A plurality of machines 20 can also work completely as normal as long as it is ensured via other measures, for example arranged local safety sensors or sufficient space between stationary machines 20, that they do not interfere with one another. As soon as a person 12 enters into the safety zone 3, the safety system 1 initiates a safety measure by the control and evaluation unit 7, e.g. an activation of the locally arranged safety sensors or a switching off of the hazardous movement of the machine 20.

A localization free zone in the safety zone 3 is optionally divided into a plurality of subzones that are only connected by zones in which radio transponders 5 can be located sufficiently well. The safety measure then always only has to be initiated in the respective subzone in which at least one radio transponder 5 is actually present.

Alternatively to the expansion of the protected zone, the local safety sensors of all the mobile autonomous vehicles 13 and stationary machines 20 can also be activated in this shaded zone by the safety system 1 as soon as at least one person 12 enters the safety zone 3.

A further possibility is for a different safety measure to be initiated in the safety zone 3, e.g. an activation of a setting up operation or a switching off of machines 20.

Restricted areas or zones within the safety zone 3 are examples of zones in which the radio location cannot be ensured. A plurality of tiers of pallets have, for example, been stored on top of one another in practice or aisles between shelves are very narrow. The goods on the pallets and in part also the shelves themselves can interfere with the radio signals so that no good radio signal coverage can be achieved in these zones with radio stations 6 that are attached, for example, to a workshop ceiling of a factory plant. Further examples include tanks and metal constructions such a containers/the interior of trucks.

An optional monitoring timer unit of a radio transponder 5 can be switched off within restricted areas or zones without radio coverage within the safety zone 3. Such a monitoring timer unit therefore does not have to be regularly reset by the control and evaluation unit 7. Alternatively, a sufficiently long reset time can be stored in the monitoring timer unit so that it is ensured that a radio transponder 5 of a mobile vehicle has left the restricted zones within the safety zone 3 again before the elapse of the time of the monitoring timer unit. As soon as the radio transponder 5 is again at the margin of the restricted zones without radio coverage at which the radio transponder 5 can again be detected sufficiently well, the radio transponder 5 is permitted to leave the restricted zones again by the control and evaluation unit 7.

Figure 2:
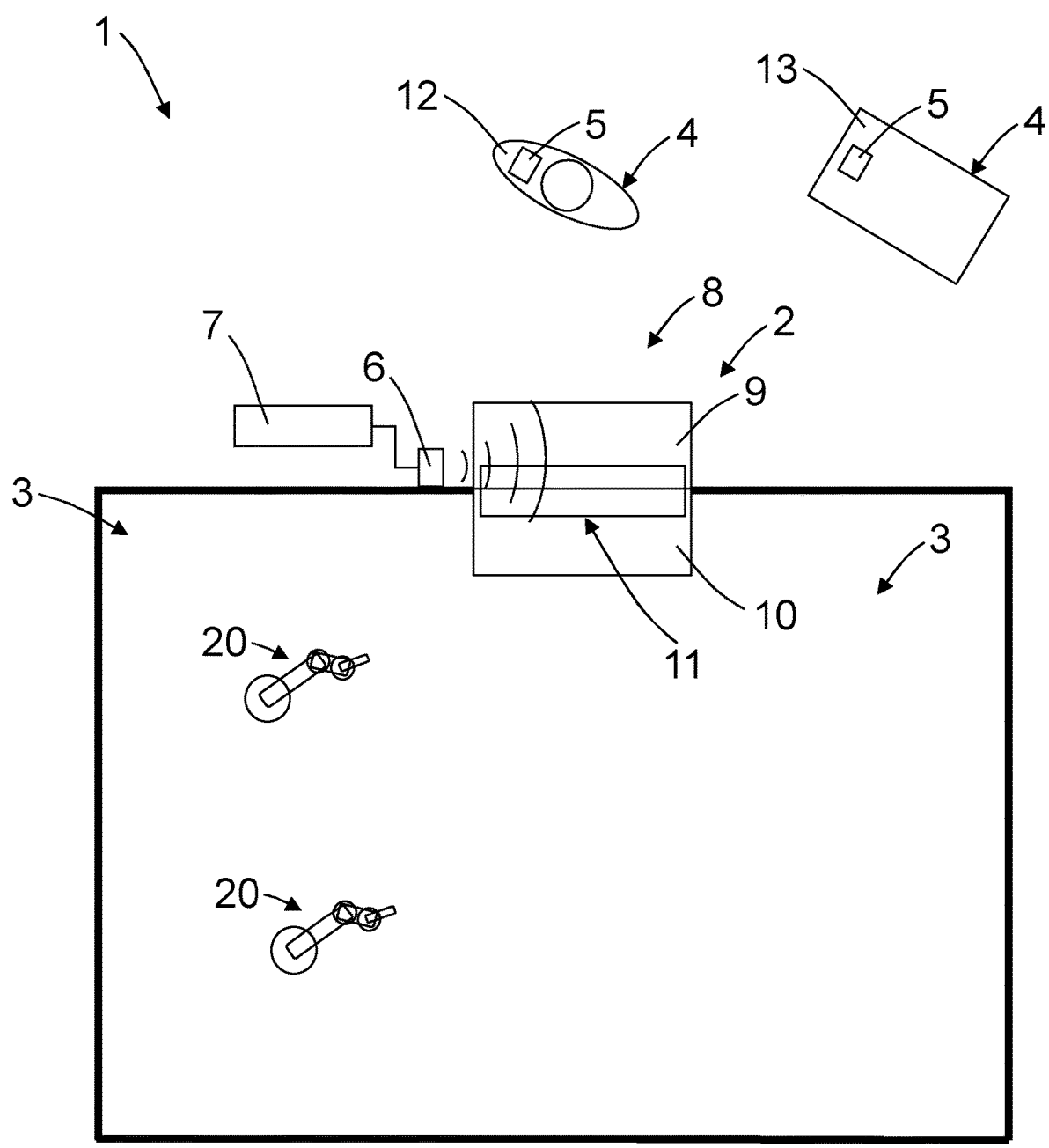

For example in accordance with FIG. 2, the access station 11 of the access zone 8 is lockable and can only be passed through by permitted objects 4. The access station 11 thus has a locking unit.

The locking unit has at least one locking element for locking or unlocking the access station. The locking unit can, for example, have magnetic and/or mechanical locking elements that effect a retaining or closing force.

The locking unit can furthermore have a closing unit by which the access station 11 can be closed and opened. The closing unit comprises a handle, for example.

Figure 4:
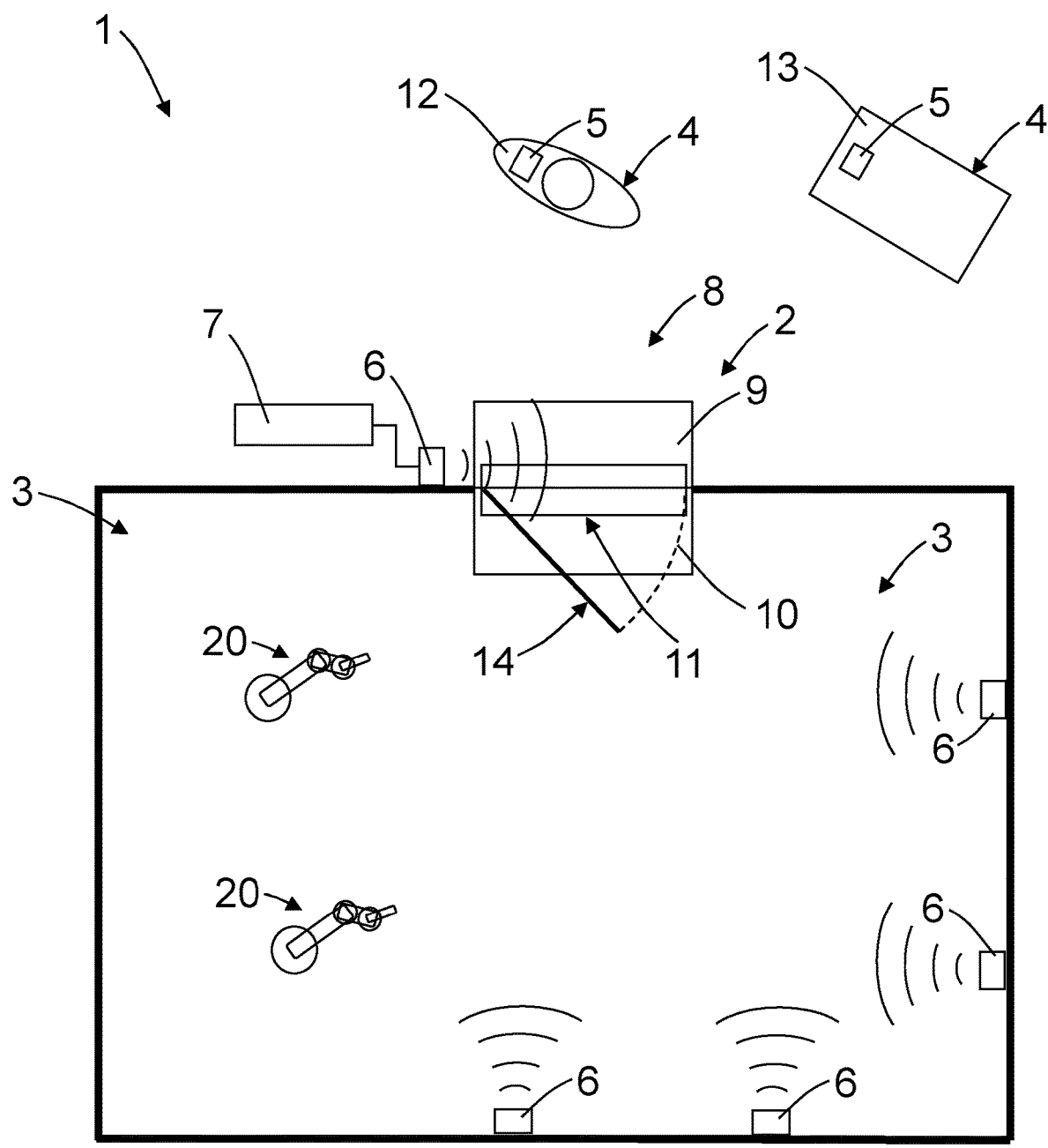

In accordance with FIG. 4, for example, the access station 11 has a door 14. The access station or the access zone can be closed and opened by the door 14 The door 14 has a door switch, whereby the control and evaluation unit 7 can determine whether the door 14 is closed or open.

The door 14 can be a swing door, a sliding door, a roller door, a lock, or a similar door 14.

A radio station 6, for example, detects or locates a radio transponder 5 in the first zone 9 in front of the door 14. The door switch measures that the door 14 has been opened and sends a door open signal to the control and evaluation unit 7.

The radio station 6 further detects or locates the radio transponder 5 in the second zone 10 after the door 14. The control and evaluation unit 7 thus detects the passage of the object 4 or person 12 through the door 14.

If both data, namely the door 14 has been opened and the admissible radio transponder 5 has been detected in the second zone 10 after the first zone 9, the entry is classified as allowed. In this case, the association of the radio transponder 5 is carried out in the control and evaluation unit 7 and thus the association of the person 12 or the autonomous vehicle 13 at which the radio transponder 5 is arranged is carried out in an association with the safety zone 3.

The door switch subsequently measures that the door 14 has been closed again and sends a door closed signal to the control and evaluation unit 7. The door closed signal can be considered by the control and evaluation unit 7 for a permitted routine.

The safety system 1 or the control and evaluation unit 7 could initiate a safety measure in the following cases or outputs a warning to the person 12 or to the user.

The door switch admittedly sends a door open signal to the control and evaluation unit 7 that the door 14 has been opened, but not a door closed signal after the elapse of a maximum time measures that the door 14 has been closed again. I.e. the door 14 is permanently open. Optionally, a timer or counter of the control and evaluation unit 7 is stopped when a radio transponder 5 is in the region of the door 14.

The door switch sends a door open signal to the control and evaluation unit 7 that the door 14 has been opened without a functioning radio transponder 5 having been in the first zone 9 in front of the door and in the second zone 10 after the door in the same time period.

The access station 11 has a door 14 with a door guard locking, for example. The door guard locking can be opened and closed by means of the radio transponder 5.

The door 14 can be a swing door, a sliding door, a roller door, a lock, or similar. A sliding door often has a right and left, movable, displaceable sliding door part. A lock can have two doors with a space between the doors.

The radio location system locates a functioning radio transponder 5 in the first zone 9 in front of the door 14. The control and evaluation unit 7 releases the door switch in that the control and evaluation unit 7 sends an opening signal to the door guard locking to open it.

The safety system 1 recognizes by means of the control and evaluation unit 7 and the radio station 6 that a passage has taken place when the radio transponder 5 has been detected in the second zone 10 after the door 14 that can already be in the safety 3 zone. When the radio transponder 5 moves from the first zone 9 in front of the door 14 to the second zone 10 behind the door 14, the move is classified as allowed and permitted.

A door switch optionally detects that the door 14 has been opened and has been closed again a predefinable time thereafter. If both data, namely the door 14 has been opened and the radio transponder 5 has moved from the first zone 9 into the second zone 10, within a determined or predefinable time window, the move is classified as allowed and permitted. In this case, the radio transponder 5 and the object 4, or the person 12, or the autonomous vehicle 13 are/is associated with the safety zone 3.

The control and evaluation unit 7 optionally transmits a signal to the door guard locking of the door 14 that the door guard locking should be closed. The control and evaluation unit 7 transmits the signal once the radio station 6 has located the radio transponder 5 in the second zone 10 and/or after the elapse of determined or predefined period of time. The time can, for example, be fixedly stored in the safety system 1 or can be parametrized or configured by customers or it can be dependent on another process parameter. Optionally, the timer or counter is stopped when a radio transponder 5 is in the region of the door 14.

A compelled passage can optionally be checked. It is therefore required that a passage through the access zone 8 necessarily has to take place. It therefore has to be ensured that the object 4, that is the person 12 or the autonomous vehicle 13, also goes through the door 14 when the associated radio transponder 5 switches the door 14 free. It has to be measured for this purpose that the door 14 has also been actuated. This can e.g. take place via a door switch. When the door switch reports that the door 14 has been opened, the radio transponder 5 also has to move from the first zone 9 into the second zone 10. It is thus prevented that a radio transponder 5 of a first person 12 switches the door 14 free, but a second person 12, e.g. without a radio transponder 5 or without access authorization, passes through the door 14. If the person 12 does not go through the door 14, the safety system 1 outputs a warning to the person 12 and/or it initiates a safety measure.

A compelled passage can optionally also be present. The person 12 can, but does not have to go through the door 14. I.e. the person 12 having the radio transponder 5 does not have to change zones, not even if a door guard locking has been opened. If the person 12 does not have to go through the door 14, the safety system 1 is simpler. If the person 12 has mistaken the access zone 8, for example, the person 12 can simply turn around. The safety system 1 is thereby more comfortable and better available.

With locks, the release of the door guard locking corresponds to a single opening, a brief waiting, and a repeat closing of the first and second doors 14.

With roller doors, the door switch corresponds to the monitoring of the height of the roller door, in the simplest case the upper or lower abutment of the roller door.

Scales that measure when a person 12 or object 4 moves through the access hone correspond to a door 14 having a door switch without a door guard locking.

Doors 14 that are provided with a motor for opening and closing can likewise be actuated by the radio transponder 5.

The routine is the same as with a passage zone having a door guard locking when the opening of the door 14 is initiated by the radio transponder 5. If the opening of the door 24 takes place by a different sensor, e.g. an additional light barrier, by registration with a factory ID, by input of a PIN code at an additional terminal, or similar, the routine then corresponds to an access zone or passage zone without a door guard locking.

How large the first zone 9 in front of the door 14 and the second zone 10 behind the door 14 is depends on the property of the door 14, that is its size, shape, etc. The size of the first zone 9 and the second zone 10 can, for example, also be parameterized or configured by the user and/or is dependent on a process parameter and/or is dependent on a parameter of the safety system 1, e.g. the accuracy of the location of the radio transponder 5.

The data transmission takes place either directly from the door switch or from the door guard locking to the control and evaluation unit 7 via radio or in a wired manner. Alternatively, the data are transmitted by the door switch by radio, for example by the NFC radio standard or Bluetooth radio standard to the radio transponder 5 on the person or autonomous vehicle and from then to the control and evaluation unit 7 by radio. An NFC radio interface or a Bluetooth radio interface is, for example, anyway already provided at the door 14 for the identification of objects 4 or persons 12.

The first zone 9 in front of the door 14 and the second zone 10 behind the door 14 can either be a specific zone that respectively forms a separately defined zone, for example having any desired shape, for example rectangular. The first zone 9 and the second zone 10 can, however, by definition, be a uniform zone in front of and behind the door, with the first zone 9 and the second zone 10 being able to be directly adjacent to one another. If a radio transponder 5 is located in a zone, this means that the likelihood for the measurement and the dwell time of the radio transponder 5 is in a certain predefined range for the radio location system. E.g. very likely for longer than 0.1 seconds in the first zone 9 or second zone 10.

It is possibly disadvantageous with a swinging door that due to the above-described procedure it is not always ensured that only person 12 having the functioning radio transponder 5 changes the zones while the door 14 is open. This can be suppressed in the simplest case by an organizational measure, i.e. there is optionally additionally a sign on which it states that always only one person 12 may go through the door 14. Alternatively, access zones 8 can be used in which it is mechanically ensured that always only one person 12 can go through.

Figure 5:
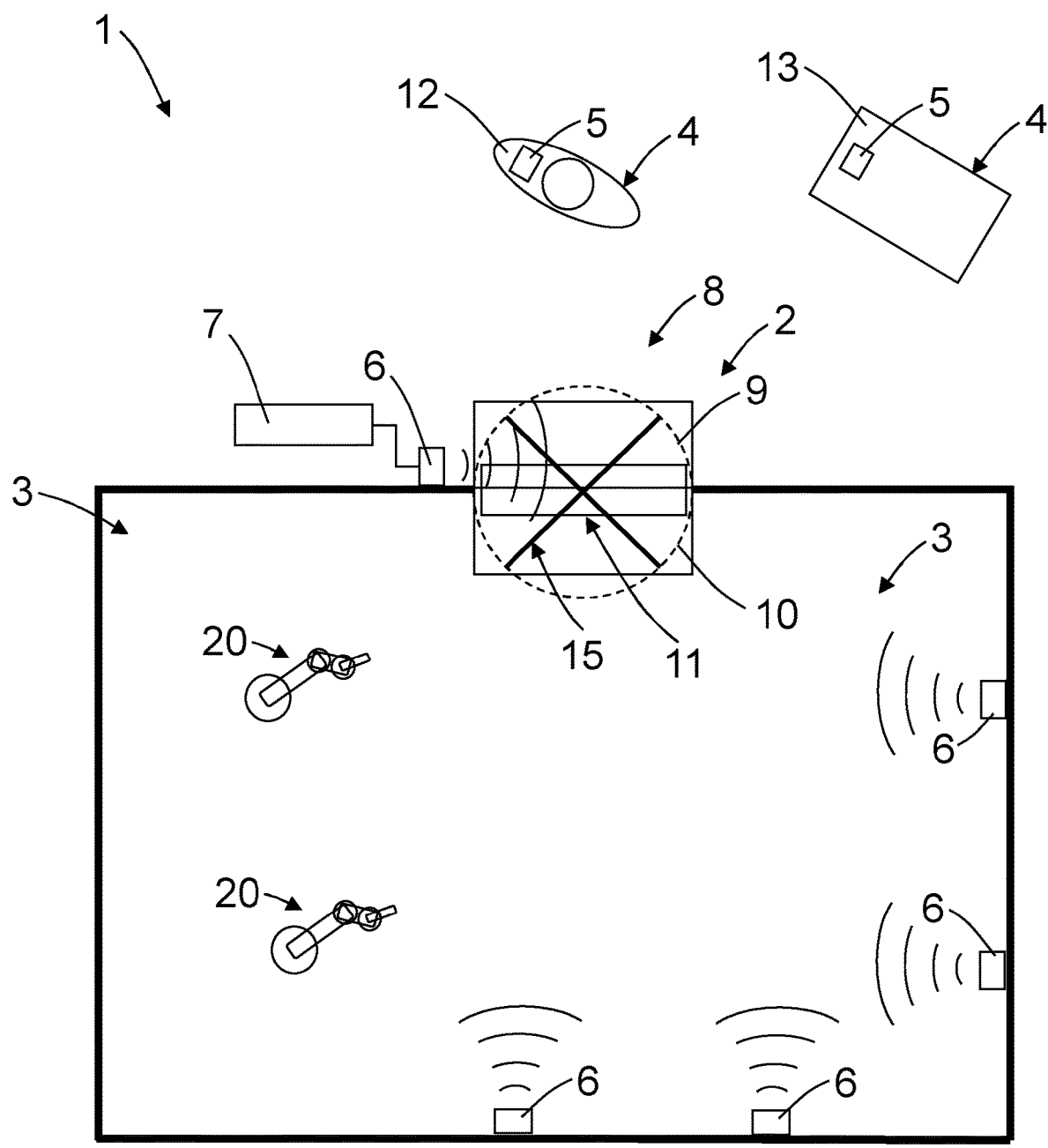

In accordance with FIG. 5, for example, the access station 11 has a mechanical turnstile 15 or revolving door. For example, the access station has a mechanical turnstile 15 having a turnstile guard locking.

If turnstiles 15 are used, a climbing over or crawling below must where necessary be safeguarded by other safety measures. E.g. by fences or safety light grids or safety light barriers.

The release of the door locking safeguard with turnstiles 15 corresponds to the release of the rotation about a section.

Figure 6:
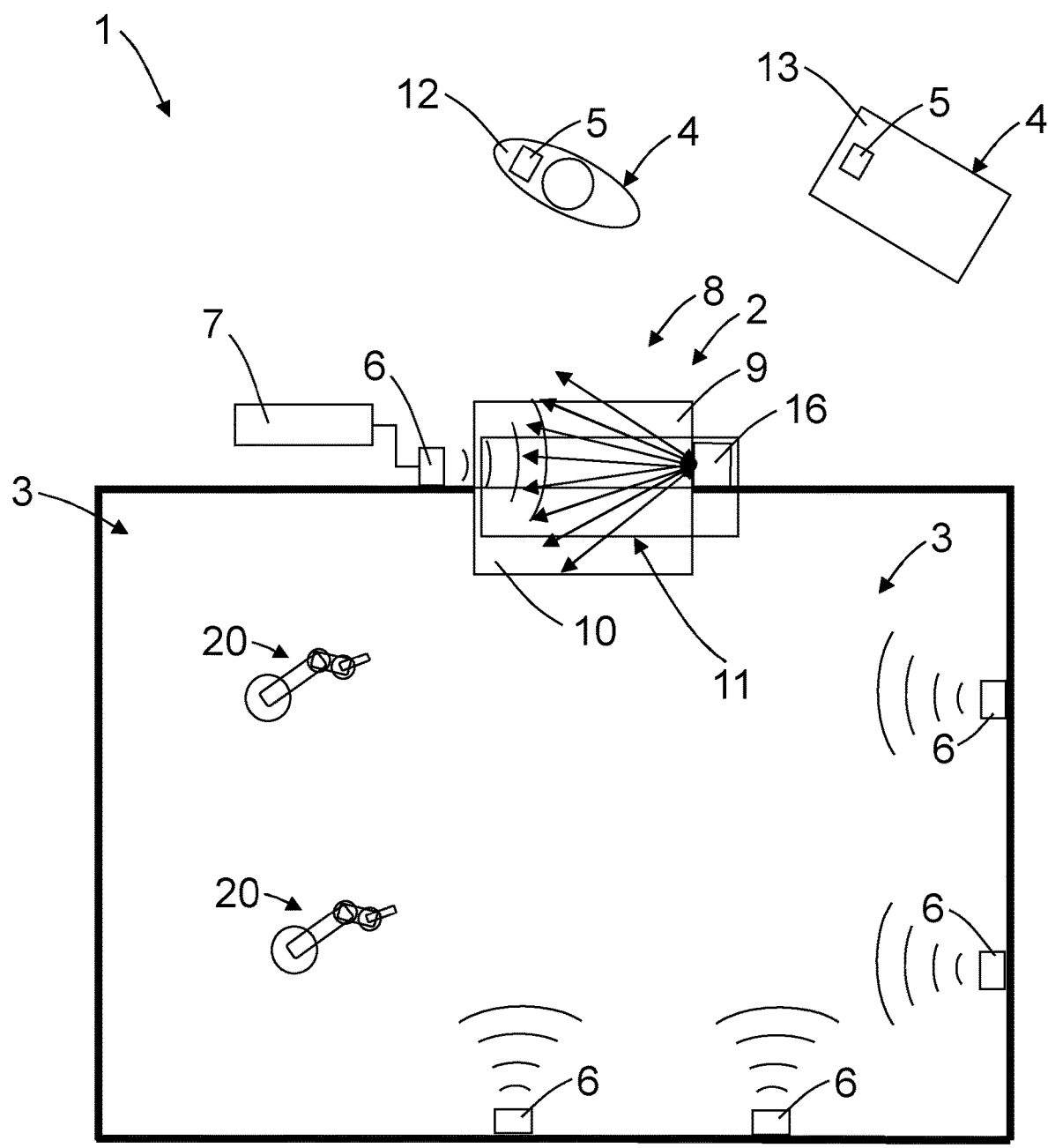

In accordance with FIG. 6, for example, the access station 11 has a spatially resolving optoelectronic sensor 16. The optoelectronic sensor 16 has a detection zone or a protected field to detect objects Whether a person 12 wants to pass through the access zone 8 without a radio transponder 5 can be detected by the spatially resolving optoelectronic sensor 16.

Access zones 8 or passage zones that are safeguarded by a spatially resolving optoelectronic sensor 16, for example a light grid or a laser scanner, permit an almost unimpeded flow of persons and material and it can simultaneously be ensured that the information whether persons 12 without radio transponders 5 are actually in the second zone 10 behind the light grid or not is made available to the safety system 1.

Optionally, it can also be prevented by an organizational measure here that a person 12 without a radio transponder 5 passes through the protected field of the optoelectronic sensor 16 at the same time as a person 12 with a radio transponder 5.

The optoelectronic sensor 16 can be a light grid, a laser scanner, a solid state laser scanner, a camera, a 3D camera, a camera based person counting system, or a similar sensor.

The spatially resolving optoelectronic sensor 16 can replace a door 14.

The spatially resolving optoelectronic sensor 16 outputs an object detection signal to the control and evaluation unit 7 when an object 4 or a person 12 has passed through the access zone 8. The routine corresponds to that of a door 14 having a door switch and without a door guard locking. The signal from the spatially resolving sensor 16 replaces the signal from the door switch.

The control and evaluation unit 7 does not trigger a safety function if a person 12 having a functional radio transponder 5 passes through the protected field of the spatially resolving sensor 16. I.e. if the radio transponder 5 is located by the safety system 1 or the radio stations 6 in the second zone 10 behind the line defined in the protected field of the spatially resolving sensor 16. Even if a person 12 without a radio transponder 5 passes through the protected field of the spatially resolving sensor 16, the control and evaluation unit 7 increments the person counter for the safety zone 3 by one unit. In the simplest case, the safety system 1 then initiates a safety measure.

Optionally, the object size and the position within the protected field can be monitored. If, for example, the object 4 is too large, too small, or passes through at the wrong point the spatially resolving sensor 16 reports this "error" to the control and evaluation unit 7 that then initiates a safety measure. The information on the object size, etc. can be transmitted to the spatially resolving sensor 16 either by the control and evaluation unit 7 or can come from a further radio station.

Other spatially resolving sensors 16 can also be used instead of a safety light grid. E.g. multibeam light grids, safety laser scanners. solid state laser scanners, camera based person counting systems, 3D cameras, or infrared cameras. Individual persons 12 can be detected using these sensors.

No further safety safeguarding of the hazardous site is, for example, necessary if an autonomous vehicle 13 stops in the access zone and safeguards the hazard site in the safety zone 3 behind the door or gate if the autonomous vehicle 13 is so wide that a person 12 can then no longer move past it through the protected field of the light grid. Only dangerous zones at the autonomous vehicle 13 itself have to be safeguarded. An open and wide access zone can thereby be simply passed through by an autonomous vehicle 13.

For example, the optoelectronic spatially resolving sensor 16 is bridged when the control and evaluation unit 7 reads permitted object information from the radio transponder 5.

Permitted objects 4 are thus detected with reference to the object contour and the objects 4 can pass through the access zone 8 with a permitted object contour. This function is also called muting.

For example, the optoelectronic spatially resolving sensor 16 is configured to detect an object contour and the control and evaluation 7 unit is configured to compare the detected object contour with a stored object contour associated with the object 4 and to classify the object 4 as a permitted object 4 on agreement.

The protected field of the local spatially resolving sensor 16 or safety sensor is adapted, for example when a functioning radio transponder 5 approaches the access zone 8. The control and evaluation unit 7 bridges the spatially resolving sensor 16 while the object 4 having the radio transponder 5 passes through the access zone 8.

When a person 12 enters the second zone 10 behind the spatially resolving sensor 16, the spatially resolving sensor 16 or the control and evaluation unit 7 triggers a safety measure for the safety zone 3. The localization takes place by the radio stations 6 with reference to the radio transponder 5 on the person 12. It can, for example, simultaneously be allowed that autonomous vehicles 13 can travel in and out in any desired number without a safety measure being initiated.

Optionally, also a part of the protected field can remain active instead of a complete muting of the spatially resolving sensor 16. I.e. the protected field is partially muted. For example to mute the contour of the respective object 4. The contour can be stored in the local spatially resolving sensor 16 (e.g. safety light grid/laser scanner, etc.), can be invoked by it in a database, or can be respectively provided via the control and evaluation unit 7. The switching over of the protected field takes place, for example, by an operating mode switchover in the light grid or a protected field switchover at the safety laser scanner/solid state scanner. It can be prevented by the partial muting that persons 12 without radio transponders 5 enter the safety zone 3.

Figure 7:
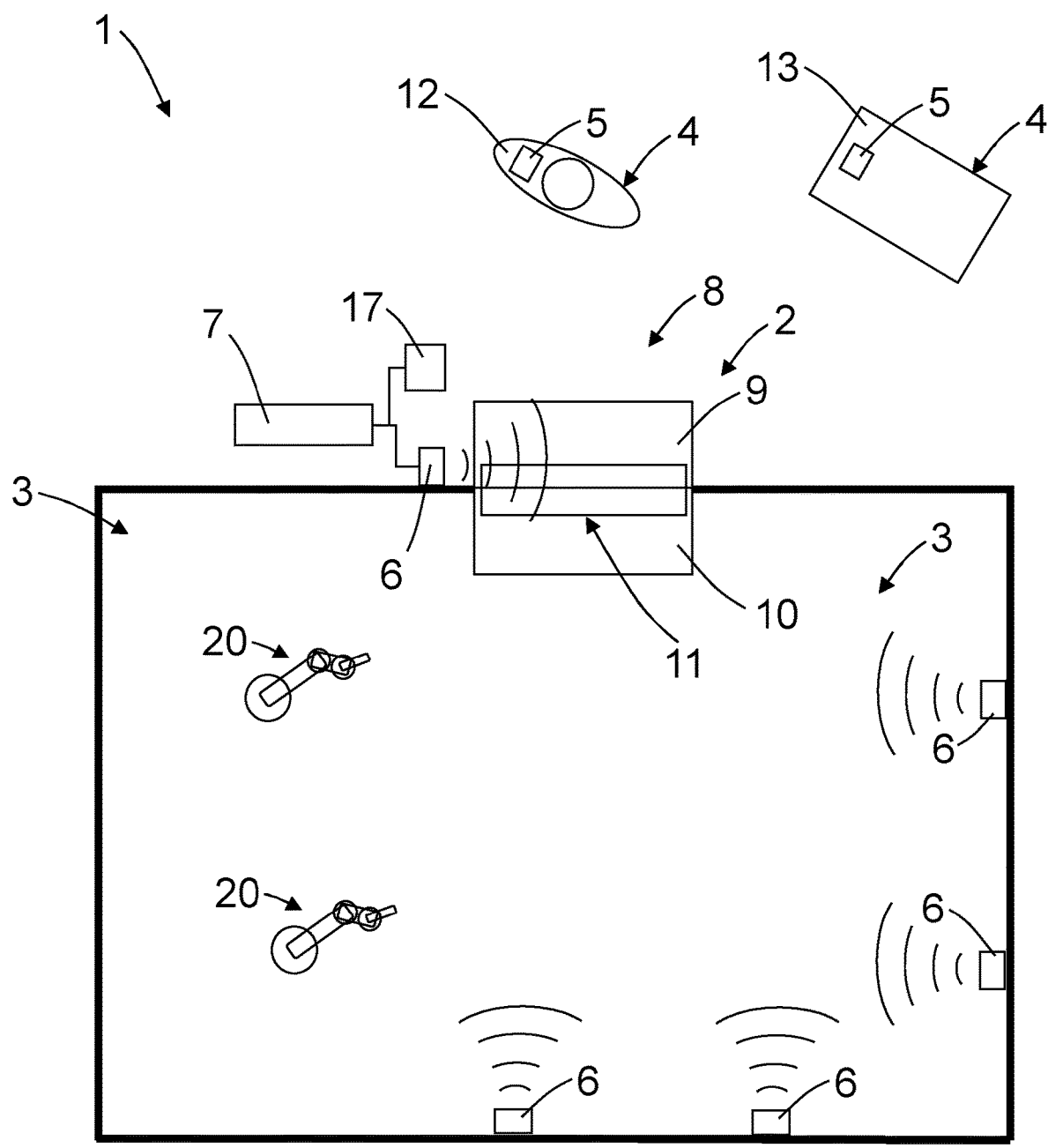

In accordance with FIG. 7, for example, a display unit 17 is arranged in front of or at the access zone 8.

The display unit 17 is, for example, formed by a traffic light. The person 12 can see with reference to the traffic light that he may enter the safety zone 3 if the associated radio transponder 5 is functioning properly and optional inspections would optionally be successfully passed.

The traffic light can be a screen on which inter alia text is presented by color markings. The traffic light can alternatively be a simple display lamp.

The traffic light visually represents the different states.

It is, for example, signaled by the color red that no access is allowed if, for example, the radio transponder 5 is not functioning. It is signaled by the color green that access is allowed. It was checked for this purpose, for example. that the radio transponder 5 is fully functional. For example, if a check is also made whether the radio transponder 5 is being correctly worn, this additional criterion would also be satisfied. It can, for example, be indicated by the color yellow that the radio transponder 5 is functioning but that the rechargeable battery of the radio transponder 5 has to be charged soon or, for example. that a maximum number of radio transponders 5 in a respective sector of the safety zone 3 has almost been reached.

The display unit 17 can also be integrated in the access station 11, the turnstile or the door, etc. The display unit 17 can, for example, display a further education status of a person 12 or a battery status of the radio transponder 5.

For example, only persons 12 having certain access authorizations should be able to enter the safety zone 3. The access authorization depends, for example, on the skills of the person 12 (skill level). They can, for example, also be certain access authorizations for security, IP protection, lab zones, adhesive zones, explosion protection zones, laser protection zones, etc. Such zones may only be entered after completion of prescribed further education courses. Only persons 12 having the suitable further education level and an access authorization may pass through the access zone. The access station 11 otherwise remains closed. The person 12 optionally receives an indication on his radio transponder 5 or an another mobile end device or, for example, a monitor in the vicinity of the access station 11 as to why the access station 11 is not opening. An access authorization can, for example, have elapsed at a certain data.

Figure 8:
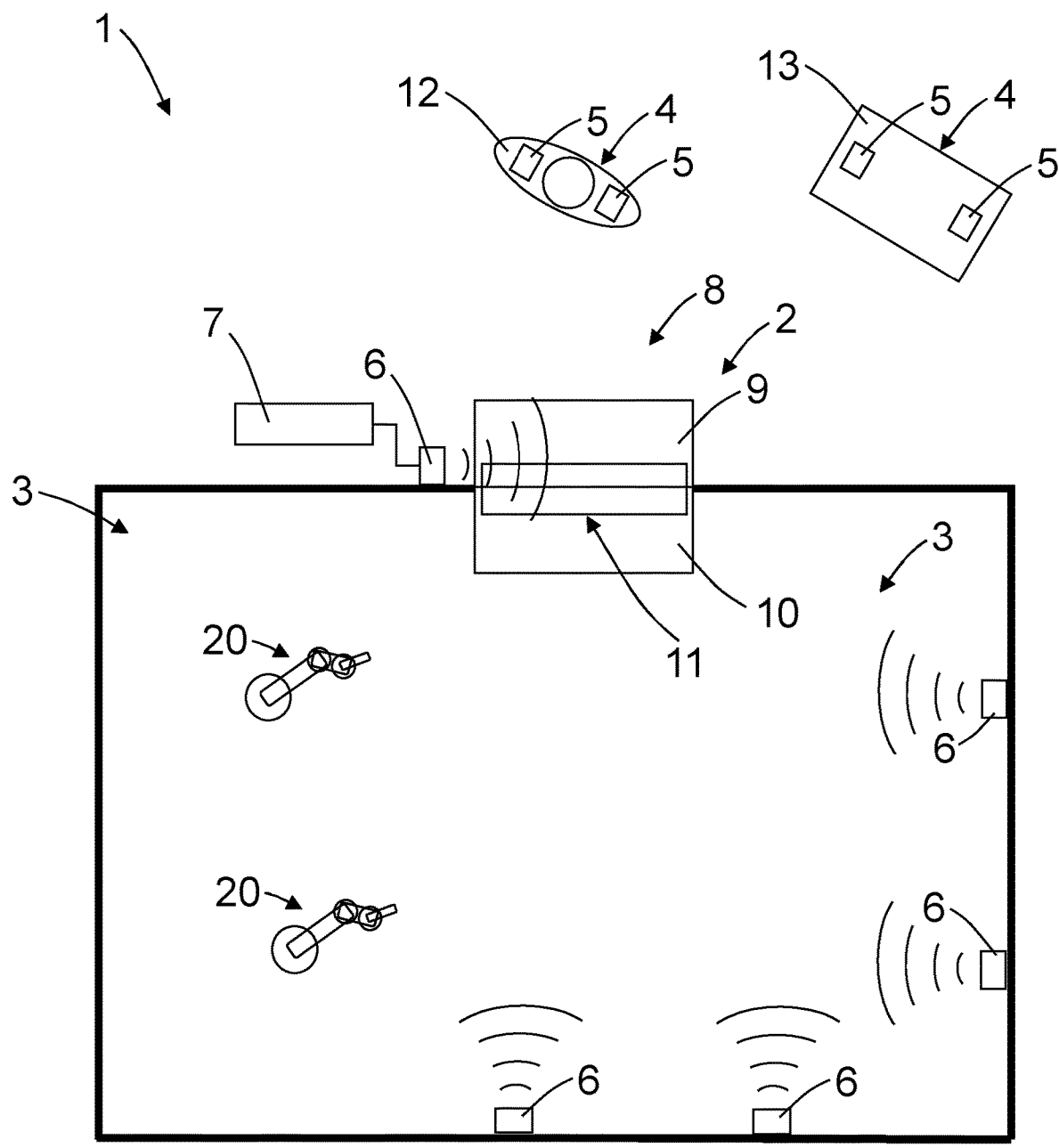

In accordance with FIG. 8, for example, at least two radio transponders 5 can be arranged at the object 4. A redundant system 5 is formed by two radio transponders 5. The object 4 can be effectively detected 4 by the second radio transponder 5 even on the failure of one radio transponder 5

For example, the radio transponder 5 has mechanical locking means and/or electronic locking means and is arranged at the object 4 in a locked manner.

The monitoring of the functioning radio transponder 5 on persons 12 and objects 4 takes place continuously. One or more of the following requirements can be checked by the control and evaluation unit 7 in the access zone 8.

A check is, for example, made cyclically whether the radio transponder 5 is still functioning properly. A check is, for example, made whether a radio connection to a sufficiently high number of radio stations 6 is present.

The battery charge status can furthermore be checked. If, for example, there is still enough power in the battery of the radio transponder 5 so that the radio transponder 5 can still be operated properly for at least, for example, a preset time.

A check can furthermore be made whether the object 4 or the person 12 is also wearing/carrying the radio transponder 5 properly. A check is made with autonomous vehicles 13 whether the radio transponder 5 is still tied to the position it should be at.

An error is, for example, reported if the person 12 is only holding the radio transponder 5 in his hand and has not properly fastened it to his body or to an article of clothing.

A check takes place, for example, whether a radio connection to a sufficiently high number pf radio stations 6 is present.

The radio transponder 5, for example, has sensors for detecting vital signals of the persons. Vital signals are, for example, a pulse beat, a body temperature, or other vital signals.

Vital signals are, for example checked or whether a mechanical closer is properly locked or a electromechanical closer is properly locked.

If the radio transponder 5 is admittedly functioning properly, that is, is communicating properly with the radio stations 6, but is not worn correctly by the person 12, the person 12 is given a warning or the door is not opened.

A check can furthermore be made whether the person 12 is authorized to enter the safety zone 3. A check is made, here, for example, whether the person 12 has a corresponding qualification.

With autonomous vehicles 13, a check is, for example, made whether the autonomous vehicle 13 is authorized to travel into the safety zone 3 due to its load (for example hazardous material, overhanging load, permitted trailer, or similar).

If the safety system 1 provides that the person 12 or the mobile autonomous vehicle 13 has to wear/carry a plurality of radio transponders 5, a plurality of radio transponders 5 are then checked.

Figure 9:
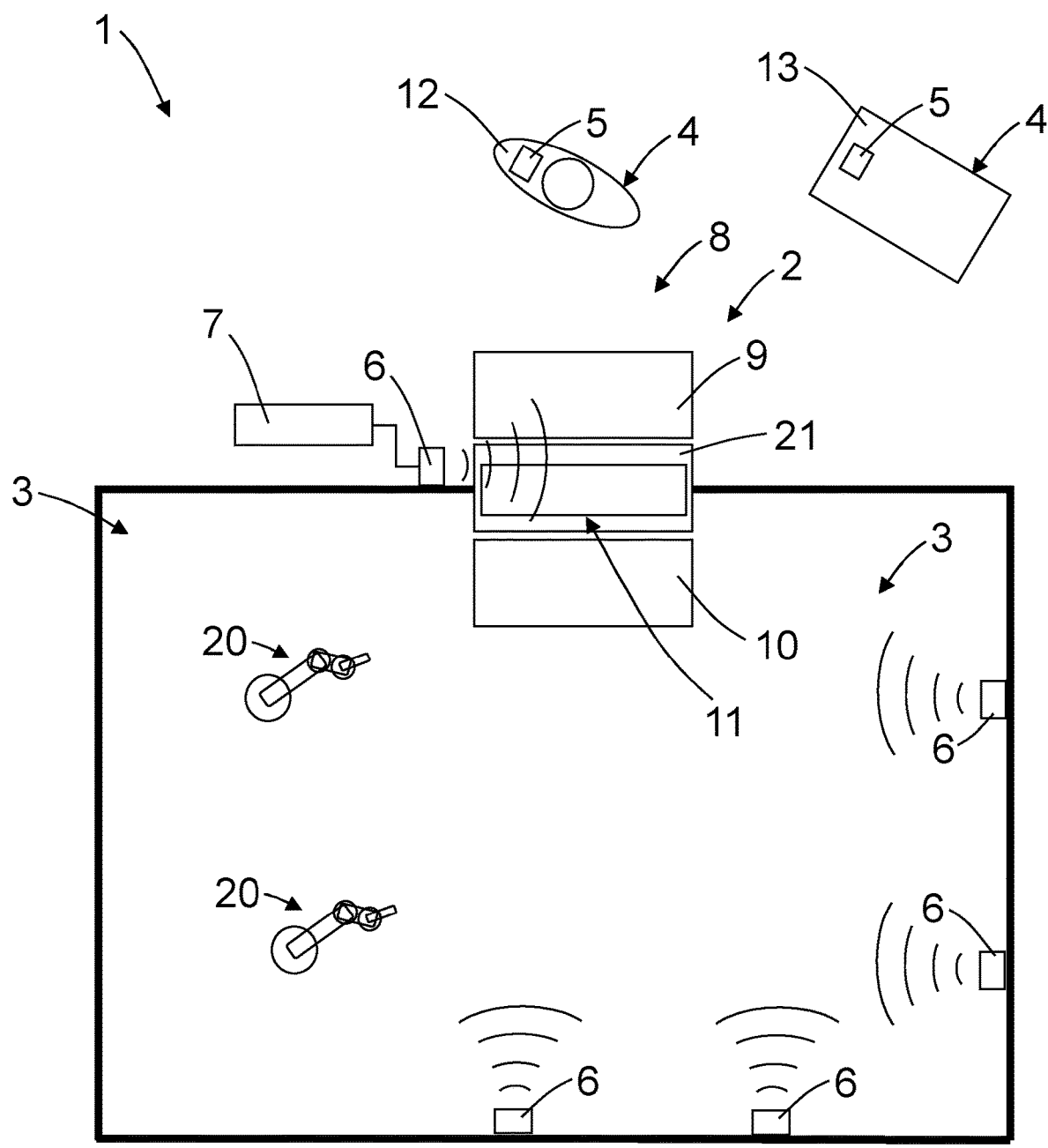

In accordance with FIG. 9, for example, the control and evaluation unit 7 is configured to again read and to check the radio transponder 5 in a third zone 21 after the access zone 8, with a permitted passing through of the access zone 8 only being present if the radio transponder 5 has been read as valid by the radio station 6 in the first zone 9, in the second zone 10, and in the third zone 21 and has been checked by the control and evaluation unit 7.

Figure 10:
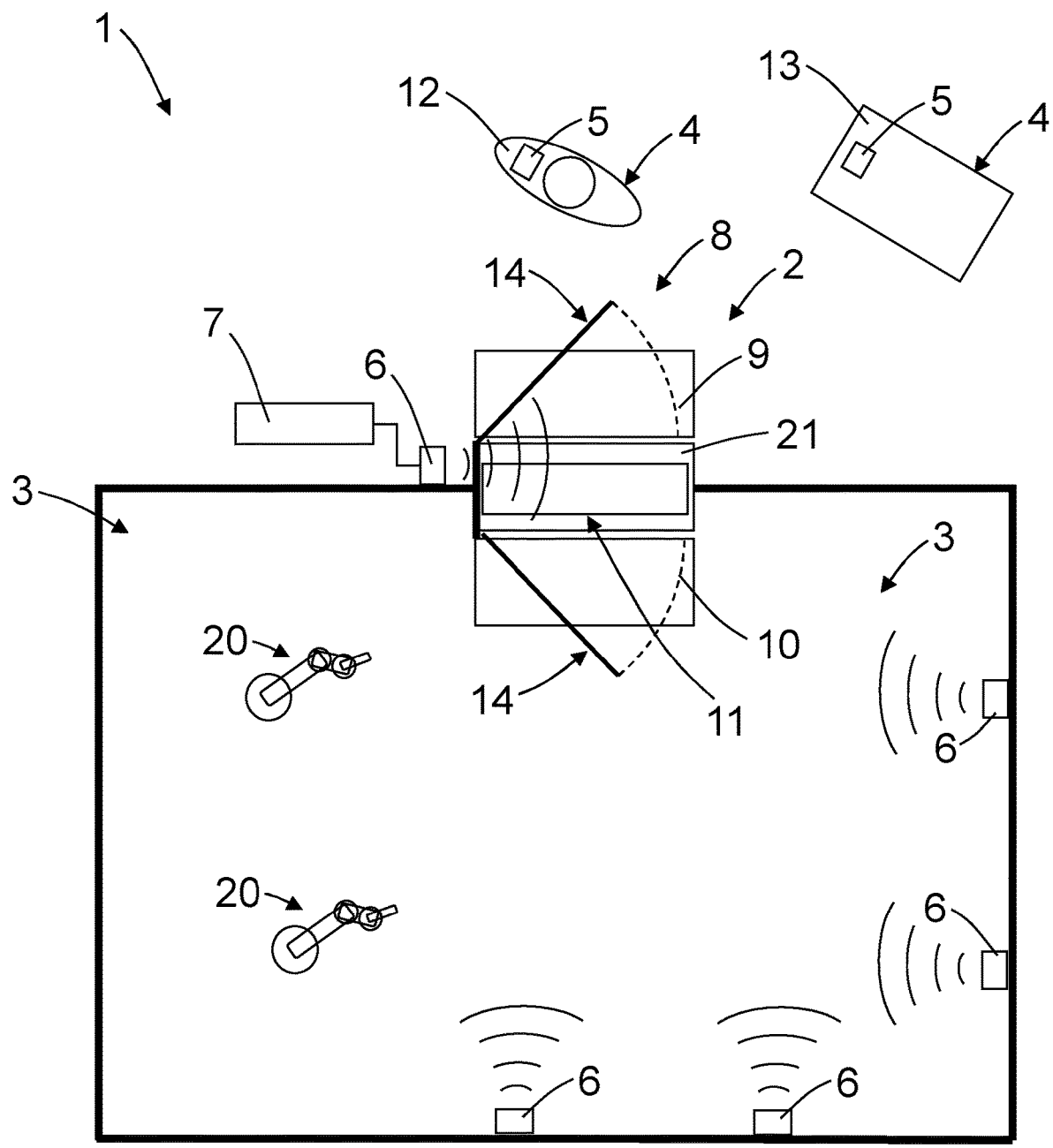

In accordance with FIG. 10, for example, a lock having two doors 14 and a space between the doors for a person 12 is provided. The third region 21 is here provided between the doors 14. A door switch is provided, for example.

The door switch of the first door 14 or of the second door 14 is actuated and respectively transmits a door actuation signal to the control and evaluation unit 7.

Only always one of the two doors 14 is opened, for example, while the second door 14 remains closed. A direct passing through of the access zone 8 is thus prevented and always only a stop has to take place in the third zone 21 between the doors 14.

The person 12 is at least located in the first zone 9 or in the second zone 10.

If all the required data are present in the control and evaluation unit 7 within a certain time window, namely that both doors 14 have been opened after each other and the radio transponder 5 has changed the zones after one another, the change is classified as allowed and permitted. The association of the radio transponder 5 with the respective zone in the safety system 1 is changed by the control and evaluation unit 7.

The door switch measures that the door 14 has been closed and sends a signal to the control and evaluation unit 7.

The control and evaluation unit 7 could initiate a safety measure in following cases or could output a warning to the person 12. The door switch admittedly sends a signal that the door 14 has been opened, but not a signal that the door 14 has been closed again after the elapse of a maximum permitted time measures. I.e. the door 14 is permanently open. A counter is optionally stopped when a radio transponder 5 is in the first zone 9 or in the second zone 10 of the door 14.

A door switch sends a signal that the door 14 has been opened without a functioning radio transponder 5 having been in the first zone 9 in front of the door or in the second zone 10 after the door in the same time period.

If both doors 24 were opened simultaneously, persons 12 without radio transponders 5 could pass through the access zone 8.

A routine in accordance with FIG. 10 could run as follows:

The safety system 1 locates a functioning radio transponder 5 in the first zone 9 in front of the door 14. The control and evaluation unit 7 releases the first door switch or a first door guard locking of the first door 14 in that the control and evaluation unit 7 transmits a signal to the first door guard locking.

The control and evaluation unit 7 optionally detects the radio transponder 5 in the third zone 21 by means of the radio stations 6.

As soon as the first door 14 has closed again, the control and evaluation unit 7 transmits a signal to the second door guard locking and unlocks the second door 14.

The control and evaluation unit 7 registers the passing through of the radio transponder 5 via the radio station 6 in that it locates the radio transponder 5 in the second zone 10 behind the door 14.

When the radio transponder 5 moves from the first zone 9 in front of the door 14 to the second zone 10 behind the door 14, the move is classified as allowed and permitted. The association of the radio transponder 5 in the safety system 1 is changed by the system from the first zone 9 into the third zone 21 and finally into the second zone 10.

The control and evaluation unit 7 optionally transmits a signal to the doors 14 or the door guard lockings that the door guard lockings should be closed again. The control and evaluation unit 7 transmits the signal once it has located the radio transponder 5 in the second zone 10 and/or after the elapse of a certain period of time. The period of time can be fixedly stored in the control and evaluation unit 7 or can be parameterized or configured by users in the control and evaluation unit 7 or it can be dependent on another process parameter. Optionally, the counter is stopped when a radio transponder 5 is in the region of the door 14.

The routine can also be implemented without a compelled passage. The control and evaluation unit 7 then opens the door guard locking at both doors 14 as soon as a functional radio transponder 5 is located in the third middle zone 21. If both doors are opened simultaneously, the safety system 1 initiates a safety measure by means of the control and evaluation unit 7. For example, it switches off the first zone 9 and the second zone 10 step by step since it cannot be precluded that a person 12 or an autonomous vehicle 13 is in one of the two ones 9 or 10 without a functional radio transponder 5.

An actuation button is, for example, provided to communicate to the control and evaluation unit 7 that no person 12 is in a shaded zone.

A confirmation button can be used to communicate to the safety system 1 or to the control and evaluation unit 7 that a person 12 is no longer present within the shaded zone. A counter is then reset for this zone and the machines 20 in the safety zone 3 can work as normal again.

The safety can be ensured by the confirmation button in access zones 8 that cannot ensure per se that only persons 12 having functioning radio transponders 5 can traverse them. They are, for example, access zones 8 through which more than one person 12 can go and, in regions without a door guard locking, e.g. a swing door or an access zone having a spatially resolving sensor 16 such as a light grid.

If there are zones or areas within the safety zone 3 that cannot be seen from outside, a second confirmation button can then be installed within the zone. Analog to zones that are safeguarded by safety light grids, the second confirmation button must be pressed in a certain time window before the first confirmation button is pressed so that the radio transponder counter for the first zone is reset.

The confirmation button is not necessary if the total access zone 8 is equipped with a lock and there are no secondary accesses and thus persons 12 can only move into the safety zone 3 through an access zone 8 having locks. It can then thereby be ensured entirely mechanically that the safety system 1 can always determine how many persons 12 can be within the safety zone 3 and optionally within shaded zones.

The confirmation button can, for example, be formed as a confirmation switch or as a key switch.

The radio location system, for example, is an ultra wideband radio location system, with the frequency used being in the range from 3.1 GHz to 10.6 GHz, with the transmission energy per radio station amounting to a maximum of 0.5 mW.

A hazardous movement of a machine 20 in at least one hazardous zone is, for example, changed into a safe state when the object 4 approaches the hazard zone or the object 4 is in the hazard zone. The remaining parts of the system can thereby continue to be productively operated.

A warning zone is, for example, formed adjacent to the hazard zone, with a hazardous movement of the machine 20 in at least one hazardous zone being changed into a safe state when the object 4 is in the warning zone.

The warning zone has the result that persons 12 may move in the safety zone 3 outside the warning zone and outside the hazardous zone. However, as soon as a person 12 is present in the warning zone, the movement in the hazardous zone is changed into the safe state. The warning zone thus forms a defined fixed zone to initiate a safe state in the hazardous zone. Depending on the trailing time of the machine 20, the warning zone can be dimensioned as larger or smaller. The hazardous zone is here only accessible via the warning zone.

For example, at least some of the plant is in a safe state in whose zone the object is 4 detected. The remaining parts of the system can thereby continue to be productively operated.

For example, the access zone 8 is arranged having at least one access station 11 for a plant, with the plant having at least one safety zone 3 and at least one hazardous zone within the safety zone 3.

REFERENCE NUMERALS

1 safety system
2 electronic access control system
3 safety zone
4 objects
5 radio transponder
6 radio station
7 control and evaluation unit
8 access zone
9 first zone
10 second zone
11 access station
12 person
13 autonomous vehicle
14 door
15 turnstile
16 optoelectronic sensor
17 display unit
18 radio location system
19 plant
20 machine
21 third zone

The invention claimed is:

1. A safety system having an electronic access control system for a safety zone for objects, having at least one radio transponder and at least one radio station to recognize the radio transponder, and having at least one control and evaluation unit that is connected to the radio station to evaluate the read radio transponder information, and having at least one spatially bounded access zone having an access station,
wherein the safety zone is only accessible via the access zone so that the access zone can be passed through by the object before reaching the safety zone and after leaving the safety zone, with the access station being actuated when an object passes through the access zone;
wherein permitted objects have the radio transponder;
wherein the radio transponder has an identification by which the object can be identified;
wherein the permitted objects having the radio transponder can pass through the access zone;
wherein the control and evaluation unit is configured to read and to check the radio transponder by the radio station on the entry of the object into the safety zone in a first zone in the direction of movement in front of the access zone;
wherein the control and evaluation unit is configured to read and to check the radio transponder again in a second zone in the direction of movement after the access zone;
with a permitted passing through of the access zone and a permitted entry into the safety zone only being present when the radio transponder in the first zone and in the second zone has been read as valid by the radio station and has been checked by the control and evaluation unit;
with permitted objects being registered by the control and evaluation unit in the safety zone;
and with non-permitted objects not being registered by the control and evaluation unit in the safety zone;
and wherein in the event of detection of a non-permitted object in the safety zone or the detection of a permitted object in the safety zone operating in a non-permitted manner, the control and evaluation unit responds by causing at least one of a warning to take place, hazardous machines in the safety zone to operate in a non-hazardous manner, or change the operation of hazardous machines in the safety zone to stop or operate in a safe state.

2. The safety system in accordance with claim 1, wherein the control and evaluation unit is configured to read and to check the radio transponder by the radio station on the leaving of the object from the safety zone in the second zone in the direction of movement in front of the access zone, with
the control and evaluation unit being configured to read and to check the radio transponder again in a first zone in the direction of movement after the access zone;
with a permitted passing through of the access zone and leaving of the safety zone only being present when the radio transponder in the second zone and in the first zone has been read as valid by the radio station and has been checked by the control and evaluation unit;
with permitted objects being registered by the control and evaluation unit in the safety zone;
and with non-permitted objects not being registered by the control and evaluation unit in the safety zone.

3. The safety system in accordance with claim 1, wherein the safety system is configured to localize and identify the object, having the control and evaluation unit and having at least one radio location system, with the radio location system having the arranged radio stations;
with position data of the radio transponder and thus of the object being able to be determined by means of the radio location system;
with the position data being able to be transmitted from the radio station of the radio location system to the control and evaluation unit;
and with the control and evaluation unit being configured to evaluate the position data of the radio transponder.

4. The safety system in accordance with claim 1, wherein the access station of the access zone can be locked and can only be passed through by permitted objects.

5. The safety system in accordance with claim 1, wherein the access station of the access zone has a door.

6. The safety system in accordance with claim 1, wherein the access station of the access zone has a door having a door locking guide.

7. A safety system in accordance with claim 1, wherein the access station of the access zone has a mechanical turnstile.

8. The safety system in accordance with claim 7, wherein the sensor comprises an optoelectronic sensor configured to detect an object contour and the control and evaluation unit is configured to compare the detected object contour with a stored object contour associated with the object and to classify the object as a permitted object on agreement.

9. A safety system in accordance with claim 1, wherein the access station of the access zone has a mechanical turnstile having a turnstile guard locking.

10. The safety system in accordance with claim 1, wherein the access station of the access zone has a spatially resolving sensor.

11. The safety system in accordance with claim 1, wherein the spatially resolving sensor is bridged when the control and evaluation unit reads permitted object information from the radio transponder.

12. The safety system in accordance with claim 1, wherein a display unit is arranged at the access zone.

13. The safety system in accordance with claim 1, wherein at least two radio transponders are arranged at the object.

14. The safety system in accordance with claim 1, wherein the radio transponder has mechanical and/or electric and/or electromagnetic locking means and is arranged at the object in a locked manner.

15. The safety system in accordance with claim 1, wherein the radio location system is an ultra-wideband radio location system, with the frequency used being in the range from 3.1 GHz to 10.6 GHz, with the transmission energy per radio station amounting to a maximum of 0.5 mW.

16. The safety system in accordance with claim 1, wherein a hazardous movement of a machine in at least one hazardous zone is changed into a safe state when the object approaches the hazardous zone or the object is present in the hazardous zone, thereby permitting at least one remaining part of the system to thereby continue operation.

17. The safety system in accordance with claim 1, wherein at least some of a plant is in a safe state in whose zone the object is detected.

18. The safety system in accordance with claim 1, wherein an NFC radio interface or a Bluetooth radio interface is additionally provided at the access station to identify objects.

19. The safety system in accordance with claim 1, wherein a barcode reader or a pixel code reader is additionally provided at the access station to identify objects.

20. A method using a safety system having an electronic access control system for a safety zone for objects, having at least one radio transponder and at least one radio station to recognize the radio transponder, and having at least one control and evaluation unit that is connected to the radio station to evaluate the read radio transponder information, and having at least one spatially bounded access zone having an access station,
 wherein the safety zone is only accessible via the access zone so that the access zone can be passed through by the object before reaching the safety zone and after leaving the safety zone, with the access station being actuated when an object passes through the access zone;
 wherein the permitted objects have the radio transponder;
 wherein the radio transponder has an identification by which the object can be identified;
 wherein the permitted objects having the radio transponder can pass through the access zone;
 wherein the radio transponder is read by the radio station on the entry of the object into the safety zone in a first zone in the direction of movement in front of the access zone and is checked by the control and evaluation unit;
 wherein the radio transponder is again read by the radio station in a second zone in the direction of movement after the access zone and is checked by the control and evaluation unit;
 with a permitted passing through of the access zone and a permitted entry into the safety zone only being present when the radio transponder in the first zone and in the second zone has been read as valid by the radio station and has been checked by the control and evaluation unit;
 with permitted objects being registered by the control and evaluation unit in the safety zone;
 and with non-permitted objects not being registered by the control and evaluation unit in the safety zone;
 and wherein in the event of detection of a non-permitted object in the safety zone or the detection of a permitted object in the safety zone operating in a non-permitted manner, the control and evaluation unit responds by causing at least one of a warning to take place, hazardous machines in the safety zone to operate in a non-hazardous manner, or change the operation of hazardous machines in the safety zone to stop or operate in a safe state.

21. A safety system having an electronic access control system for a safety zone for objects, having at least one radio transponder and at least one radio station to recognize the radio transponder, and having at least one control and evaluation unit that is connected to the radio station to evaluate the read radio transponder information, and having at least one spatially bounded access zone having an access station,
 wherein the safety zone is only accessible via the access zone so that the access zone can be passed through by the object before reaching the safety zone and after leaving the safety zone, with the access station being actuated when an object passes through the access zone;
 wherein permitted objects have the radio transponder;
 wherein the radio transponder has an identification by which the object can be identified;
 wherein the permitted objects having the radio transponder can pass through the access zone;
 wherein the control and evaluation unit is configured to read and to check the radio transponder by the radio station on the entry of the object into the safety zone in a first zone in the direction of movement in front of the access zone;
 wherein the control and evaluation unit is configured to read and to check the radio transponder again in a second zone in the direction of movement after the access zone, with a permitted passing through of the access zone and a permitted entry into the safety zone only being present when the radio transponder in the first zone and in the second zone has been read as valid by the radio station and has been checked by the control and evaluation unit;

wherein the control and evaluation unit is configured to read and to check the radio transponder again in a third zone after the access zone, with a permitted passing through of the access zone only being present when the radio transponder in the first zone, in the second zone, and in the third zone has been read as valid by the radio station and has been checked by the control and evaluation unit, thereby preventing uninterrupted direct passage between the first and second zones, with permitted objects being registered by the control and evaluation unit in the safety zone;

and with non-permitted objects not being registered by the control and evaluation unit in the safety zone.

* * * * *